US012700592B2

(12) United States Patent
Nose et al.

(10) Patent No.: US 12,700,592 B2
(45) Date of Patent: Aug. 4, 2026

(54) ELECTRODE, ELECTROCHEMICAL ELEMENT, LIQUID COMPOSITION, AND METHOD FOR PRODUCING ELECTRODE

(71) Applicants: Daisuke Nose, Kanagawa (JP); Minehide Kusayanagi, Kanagawa (JP); Ryuji Higashi, Kanagawa (JP); Kohji Matsuoka, Kanagawa (JP); Yuu Zama, Kanagawa (JP); Takuya Saiga, Kanagawa (JP); Tomoya Ohmura, Kanagawa (JP)

(72) Inventors: Daisuke Nose, Kanagawa (JP); Minehide Kusayanagi, Kanagawa (JP); Ryuji Higashi, Kanagawa (JP); Kohji Matsuoka, Kanagawa (JP); Yuu Zama, Kanagawa (JP); Takuya Saiga, Kanagawa (JP); Tomoya Ohmura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 614 days.

(21) Appl. No.: 18/114,990

(22) Filed: Feb. 28, 2023

(65) Prior Publication Data

US 2023/0290951 A1 Sep. 14, 2023

(30) Foreign Application Priority Data

Mar. 9, 2022 (JP) ................................ 2022-036634

(51) Int. Cl.

| | |
|---|---|
| ***H01M 4/62*** | (2006.01) |
| ***H01M 4/04*** | (2006.01) |
| ***H01M 10/0525*** | (2010.01) |
| *H01M 4/02* | (2006.01) |

(52) U.S. Cl.
CPC ......... *H01M 4/622* (2013.01); *H01M 4/0404* (2013.01); *H01M 4/0471* (2013.01); *H01M 10/0525* (2013.01); *H01M 2004/028* (2013.01)

(58) Field of Classification Search
CPC .............................. H01M 4/366; H01M 4/622
See application file for complete search history.

(56) References Cited

U.S. PATENT DOCUMENTS 10,847,799 B2 * 11/2020 Lee .................. H01M 10/4235
2017/0309917 A1 10/2017 Lee et al.
(Continued)

FOREIGN PATENT DOCUMENTS

CN 111009638 A 4/2020
EP 4207335 A2 * 7/2023 ............. H01M 4/62
(Continued)

OTHER PUBLICATIONS

Partial European Search Report issued Mar. 12, 2024 in European Patent Application No. 23157631.5, 16 pages.
(Continued)

*Primary Examiner* — Amanda C. Walke
(74) *Attorney, Agent, or Firm* — XSENSUS LLP

(57) ABSTRACT

An electrode is provided that includes a current collector, an electrode mixture layer on the current collector, and an insulating layer on the electrode mixture layer. The electrode mixture layer includes an active material. The insulating layer includes an insulating material and a resin having a repeating structural unit represented by a specific general formula.

15 Claims, 9 Drawing Sheets

(56) References Cited

U.S. PATENT DOCUMENTS

| | | | | |
|---|---|---|---|---|
| 2018/0040868 | A1* | 2/2018 | Jang | H01M 10/0525 |
| 2018/0261827 | A1 | 9/2018 | Yanagita et al. | |
| 2019/0140284 | A1* | 5/2019 | Fukatani | H01M 4/13 |
| 2019/0288259 | A1 | 9/2019 | Ohkimoto et al. | |
| 2019/0288276 | A1 | 9/2019 | Utsuki et al. | |
| 2020/0119333 | A1 | 4/2020 | Masuzawa et al. | |
| 2020/0321616 | A1 | 10/2020 | Takauji et al. | |
| 2021/0028485 | A1* | 1/2021 | Inoue | H01M 10/0525 |
| 2021/0261796 | A1 | 8/2021 | Kawase et al. | |
| 2022/0013865 | A1 | 1/2022 | Matsuoka et al. | |

FOREIGN PATENT DOCUMENTS

| | | |
|---|---|---|
| JP | 7-220759 | 8/1995 |
| JP | 2021-082511 | 5/2021 |

OTHER PUBLICATIONS

Ben Tang, et al., "Poly(maleic anhydride) copolymers-based polymer electrolytes enlighten highly safe and high-energy-density lithium metal batteries: Advances and prospects", Nano Select, vol. 1, No. 1, Jun. 28, 2020 (Received: May 7, 2020; Accepted: May 18, 2020), 20 pages, XP093137017.

LinYong Song et al: "Preparation of Hairy Particles by Grafting PEG onto the Poly(styrene-co-maleic anhydride) Surface and PEG Effect on SiO2 Nanoparticles Adsorption", Journal of Applied Polymer Science, vol. 129, No. 6, Mar. 1, 2013 (Received: Sep. 13, 2012; Accepted: Feb. 4, 2013), 6 pages, XP093137023.

Office Action issued Jan. 21, 2025 in Korean Patent Application No. 10-2023-0029589, 19 pages.

* cited by examiner

ELECTRODE, ELECTROCHEMICAL ELEMENT, LIQUID COMPOSITION, AND METHOD FOR PRODUCING ELECTRODE

CROSS-REFERENCE TO RELATED APPLICATIONS

This patent application is based on and claims priority pursuant to 35 U.S.C. § 119(a) to Japanese Patent Application No. 2022-036634, filed on Mar. 9, 2022, in the Japan Patent Office, the entire disclosure of which is hereby incorporated by reference herein.

BACKGROUND

Technical Field

The present disclosure relates to an electrode, an electrochemical element, a liquid composition, and a method for producing an electrode.

Related Art

Since an electrochemical element such as a lithium-ion secondary battery exhibits high energy density, the electrochemical element is expected to be used in a large-capacity power source such as an electric vehicle. Under such circumstances, further improvement in safety of the electrochemical element is required. In recent years, in order to improve the volumetric energy density of the electrochemical element, a separator continues to be made thinner, making it more difficult to ensure the safety.

Regarding such an issue, many attempts have been made to dispose an insulating layer such as ceramic between a positive electrode layer or a negative electrode layer and the separator. The insulating layer may be disposed on the separator or an electrode mixture layer. However, for the purpose of further ensuring the safety, an integrated electrode with a structure in which the insulating layer is formed on the electrode mixture layer has been developed.

SUMMARY

One aspect of the present disclosure provides an electrode including a current collector, an electrode mixture layer on the current collector, and an insulating layer on the electrode mixture layer. The electrode mixture layer includes an active material. The insulating layer includes an insulating material and a resin having a repeating structural unit represented by the following general formula (1), (2), (3) or (4):

(1)

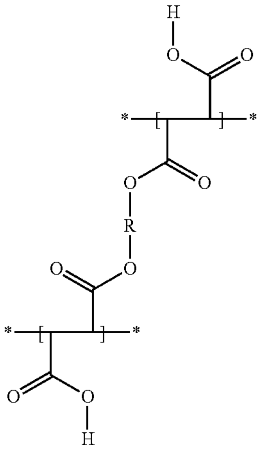

-continued (2)

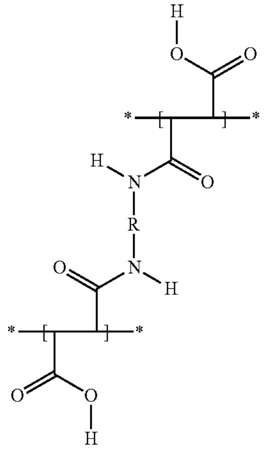

(3)

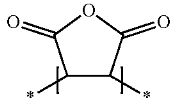

(4)

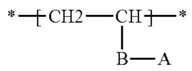

where, in the general formulae, "*" represents a bonding site with an adjacent main chain structural unit, "R" represents at least one structure of polyethylene oxide, polypropylene oxide, polycarbonate, silicone, polybutadiene, or hydrogenated polybutadiene butane, "A" represents an alkyleneoxy chain having a repeating unit structure of an ethyloxy group or a propyloxy group terminally protected by a hydroxyl group or an alkyl group having 1 to 4 carbon atoms, and "B" represents an ester group, an amide group, or an oxygen atom.

According to one aspect of the present disclosure, the electrode is provided with which the electrochemical element with high output and high safety can be obtained.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
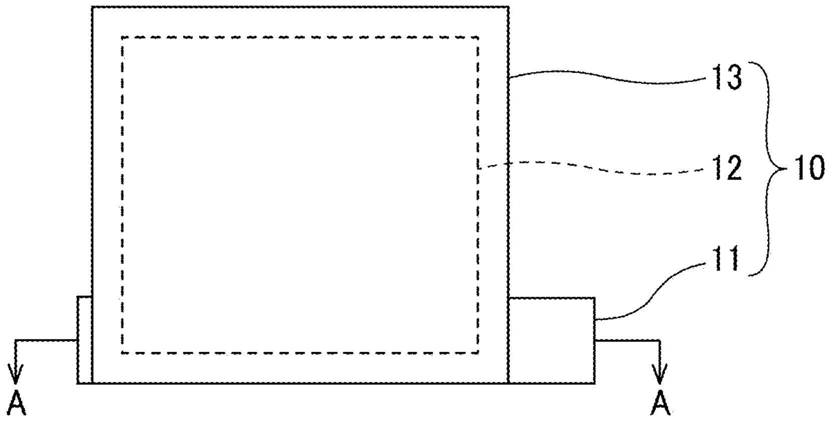
FIG. 1 is a schematic diagram illustrating an example of an electrode (negative electrode)

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the related art, an insulating layer is formed as a porous protective film on the surface of an active material layer by applying a slurry obtained by dispersing an insulating material in a solvent together with a binder such as polyvinylidene fluoride to the surface of the active material layer of at least one of a positive electrode or a negative electrode.

From the viewpoint of improving the volumetric energy density of the electrochemical element, the insulating layer is desired to be applied thinly and uniformly on a base material to be coated. Thus, such a slurry needs to be highly concentrated and of low viscosity.

However, in a system in which a polymer binder is dissolved in a liquid composition in order to provide binding between the insulating materials in the insulating layer or between the insulating material and the active material, the viscosity rises significantly, making it difficult to perform a thin coating. Further, in a system in which the polymeric binder is dispersed, migration of the binder often occurs in the film, making it difficult to obtain uniform binding.

Thus, with the conventional electrode having the insulating layer disposed on the surface of the electrode mixture layer, there is a limit to achieving both high output and high safety in the electrochemical element.

An object of the present disclosure is to provide an electrode with which an electrochemical element with high output and high safety can be obtained.

Embodiments of the present disclosure will be described below with reference to drawings. Note that the same reference numerals are given to the same configurations, and the description of such configurations may be omitted.

First Embodiment

<<Electrode>>

First, a first embodiment will be described. An electrode according to the first embodiment includes an electrode mixture layer, including an active material, disposed on a current collector and an insulating layer, including an insulating material, disposed on the electrode mixture layer.

The current collector is also called an electrode base material, and a highly conductive substance is used in the current collector. The highly conductive substance is not particularly limited. However, in general, aluminum is used for a positive electrode and copper is used for a negative electrode.

The electrode mixture layer is mainly composed of an active material such as a positive electrode active material or a negative electrode active material. Note that the phrase "being mainly composed of an active material such as a positive electrode active material or a negative electrode active material" described in the present specification and claims means that the active material constitutes 70% by mass or more in the electrode mixture layer. The positive electrode active material is not particularly limited as long as the positive electrode active material can be intercalated or deintercalated with an alkali metal ion. For example, an alkali-metal-containing transition metal compound can be used as the positive electrode active material.

Examples of the alkali-metal-containing transition metal compound include, but are not limited to, a lithium-containing transition metal compound such as a composite oxide including one or more elements selected from the group consisting of cobalt, manganese, nickel, chromium, iron, and vanadium, and lithium.

Examples of the lithium-containing transition metal compound include, but are not limited to, lithium cobalt oxide, lithium nickel oxide, and lithium manganese oxide.

As the alkali-metal-containing transition metal compound, a polyanionic compound having a tetrahedron represented by $XO_4$ ("X" represents P, S, As, Mo, W, Si, etc.) in the crystal structure can also be used. Among the alkali-metal-containing transition metal compounds, a lithium-containing transition metal phosphate compound such as lithium iron phosphate or lithium vanadium phosphate is preferable in terms of cycle characteristics, and lithium vanadium phosphate is particularly preferable in terms of lithium diffusion coefficient and output characteristics.

Note that, in terms of electron conductivity, it is preferable that the surface of the polyanionic compound is coated with a conductive auxiliary agent such as a carbon material to form a composite.

The negative electrode active material is not particularly limited as long as the negative electrode active material can be intercalated or deintercalated with an alkali metal ion.

However, a carbon material including graphite having a graphite-type crystal structure can be used as the negative electrode active material.

Examples of the carbon material include, but are not limited to, natural graphite, synthetic graphite, poorly-graphitizable carbon (hard carbon), and easily-graphitizable carbon (soft carbon).

Examples of the negative electrode active material other than the carbon material include, but are not limited to, lithium titanate and titanium oxide.

Further, in terms of the energy density of a non-aqueous electrochemical element, it is preferable to use a high-capacity material such as silicon, tin, a silicon alloy, a tin alloy, silicon oxide, silicon nitride, or tin oxide as the negative electrode active material.

The insulating layer is a porous layer formed by an insulating material having a volume resistivity of $10^8 \Omega \cdot cm$ or more.

Examples of the insulating material include, but are not limited to, an inorganic material such as aluminum oxide (alumina), silica, aluminum nitride, silicon nitride, cordierite, Sialon, mullite, steatite, yttria, zirconia, or silicon carbide and a resin material such as a styrene-based, acrylic acid-based, polyester-based, polyimide-based, or polyamide-based resin material.

Among these insulating materials, an inorganic material is preferable, an inorganic oxide is more preferable, aluminum oxide and silica are still more preferable in terms of heat resistance, and α-alumina is particularly preferable among aluminum oxides.

Note that α-alumina is known to function as a scavenger for a "junk" chemical species, that is, a chemical species that can cause capacity fading in a lithium-ion secondary battery. Further, α-alumina has good wettability and affinity with an electrolyte and is expected to improve cycle performance of the lithium-ion secondary battery.

Examples of the shape of the insulating material include, but are not limited to, rectangular, spherical, elliptical, cylindrical, oval, dog-bone, and irregular shapes in a form of particles. However, the aspect ratio of the short side relative to the long side is preferably close to 1 in terms of an inkjet ejection property.

In the electrode of the present embodiment, the insulating layer includes at least one resin having a repeating structural unit represented by the following general formula (1), (2), (3) or (4).

(1)

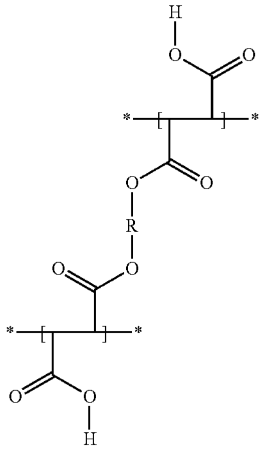

-continued (2)

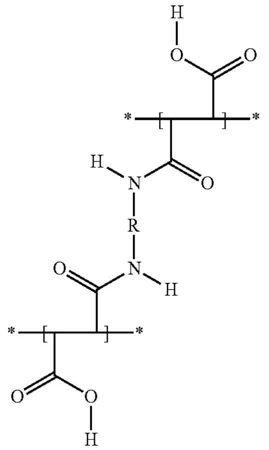

(3)

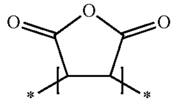

(4)

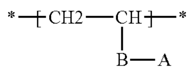

In the general formulae (1) to (4), "*" represents a binding site with an adjacent main chain structural unit. In the general formulae (1) and (2), "*R" represents at least one structure of polyethylene oxide, poly propylene oxide, polycarbonate, silicone, poly butadiene, or hydrogenated poly butadiene butane.

Further, in the general formula (4), "A" represents an alkyleneoxy chain having a repeating unit structure of an ethyloxy group or a propyloxy group terminally protected by a hydroxyl group or an alkyl group having 1 to 4 carbon atoms, and "B" represents an ester group, an amide group, or an oxygen atom.

Note that, in the present specification, the term "resin" means a structure having a number average molecular weight (Mn) of 1000 to 100000.

In the present embodiment, the resin included in the insulating layer preferably includes one resin having the repeating structural unit represented by the general formula (1) or (2).

The resin having the repeating structural unit represented by the general formula (1) or (2) is a cross-linked resin. The term "cross-linked resin" described herein refers to a resin having a three-dimensional steric structure in which main chains of polymer molecules are linked by chemical bonds. Using the cross-linked resin as the resin having the repeating structural unit represented by the general formula (1) or (2) makes it possible to improve binding between the insulating particles.

Note that "R" in the general formula (1) or (2) is preferably a poloxamer. In the present specification, the poloxamer refers to a block copolymer composed of polyethylene oxide and polypropylene oxide.

The cross-linked resin having the repeating structural unit represented by the general formula (1) or (2) is formed by reaction (i.e., a reaction product) of a resin having a repeating structural unit represented by the following general formula (3) and a resin represented by the following general formula (5).

(3)

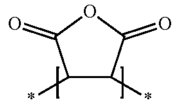

(5)

R3—R2—R4

In the general formula (3), "*" represents a binding site with an adjacent main chain structural unit. Further, in the general formula (5), "R2" represents at least one structure of polyethylene oxide, polypropylene oxide, polycarbonate, silicone, polybutadiene, or hydrogenated polybutadiene butane, and "R3" and "R4" each independently represent a hydroxyl group or an amino group.

Note that "R2" in the general formula (5) is preferably a poloxamer in terms of improving binding between the insulating particles.

In the electrode of the present embodiment, the mass ratio of the resin having the repeating structural unit represented by the general formula (1) or (2) described above relative to the insulating material is 1.5% or more and 15% or less, preferably 2% or more and 14% or less, more preferably 2.5% or more and 13% or less.

In the electrode of the present embodiment, the average value of the coverage (also referred to as "average coverage") of the insulating layer for the electrode mixture layer is 70% or more, preferably 80% or more, and more preferably 90% or more.

In the electrode of the present embodiment, the basis weight of the insulating layer for the electrode mixture layer is 0.3 $mg/cm^2$ or more and 1.5 $mg/cm^2$ or less, preferably 0.4 $mg/cm^2$ or more and 1.5 $mg/cm^2$ or less, more preferably 0.5 $mg/cm^2$ or more and 1.5 $mg/cm^2$ or less.

Figure 2:
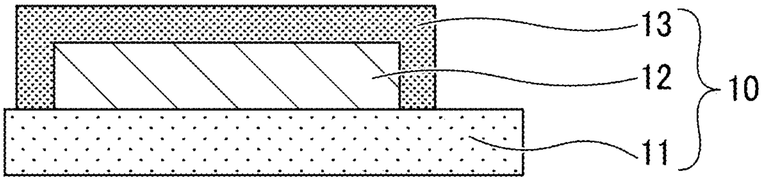
FIG. 2 is a cross-sectional view taken along a line A-A in FIG. 1.
Figure 3:
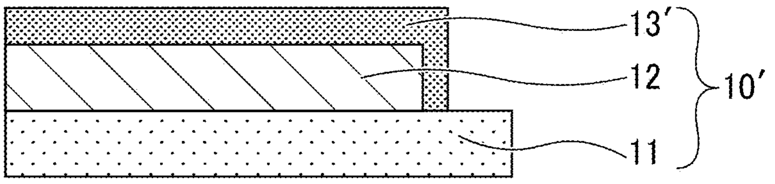
FIG. 3 is a cross-sectional diagram illustrating a modification of the negative electrode.

FIG. 1 is a schematic diagram of a negative electrode as an example of an electrode according to a first embodiment, FIG. 2 is a cross-sectional diagram taken along a line A-A in FIG. 1, and FIG. 3 is a cross-sectional diagram illustrating a modification of the negative electrode. Referring to FIG. 1 and FIG. 2, a negative electrode 10 includes a negative electrode current collector 11, a negative electrode mixture layer 12 formed on the negative electrode current collector 11, and an insulating layer 13 formed on the negative electrode mixture layer 12.

The shape of the negative electrode 10 is not particularly limited and can be appropriately selected according to the purpose. For example, a flat-plate shape can be mentioned.

In the negative electrode 10, the insulating layer 13 covers all or a part of the negative electrode mixture layer 12. For example, the insulating layer 13 may cover the entire surface and side surfaces of the negative electrode mixture layer 12 (FIG. 2). Further, the negative electrode 10 may be a negative electrode 10' in which an insulating layer 13'covers only the surface and a part of the side surfaces of the negative electrode mixture layer 12 (FIG. 3).

The average thickness of the insulating layer 13 formed on the upper surface of the negative electrode mixture layer 12 is not particularly limited and can be appropriately selected according to the purpose. However, the average thickness is preferably 0.5 μm or more for exhibiting safety effects, and preferably 24 μm or less from the viewpoint of preventing deterioration of battery characteristics.

Figure 4:
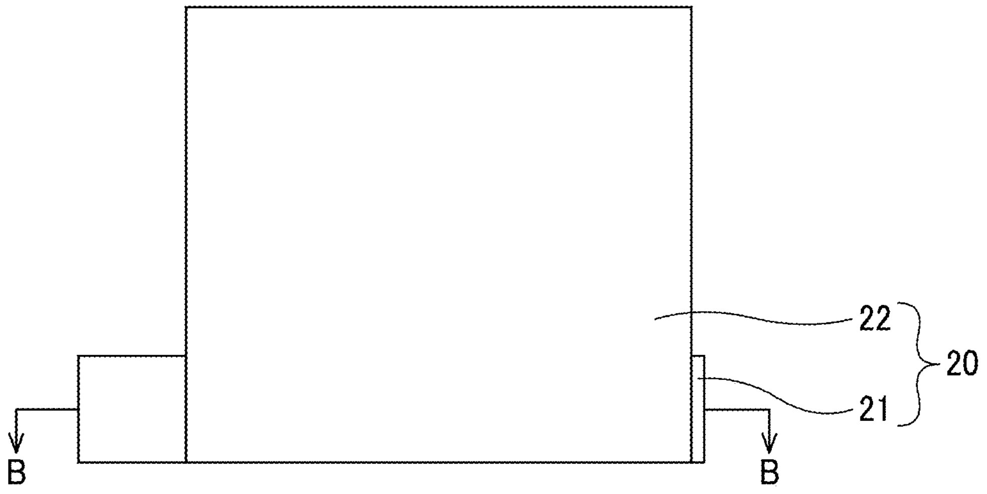
FIG. 4 is a schematic diagram illustrating an example of an electrode (positive electrode)
Figure 5:
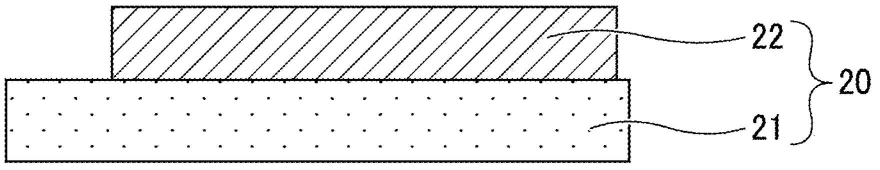
FIG. 5 is a cross-sectional view taken along a line B-B in FIG. 4.
Figure 6:
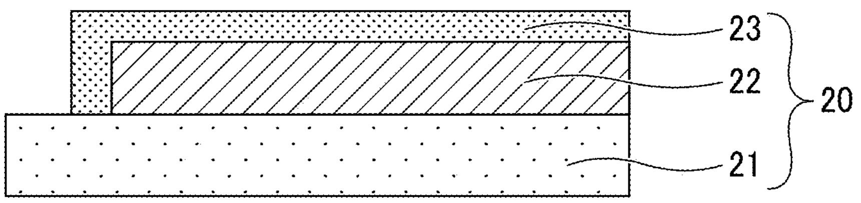
FIG. 6 is a cross-sectional diagram illustrating a modification of the positive electrode.

FIG. 4 is a schematic diagram of a positive electrode as an example of the electrode according to the present embodiment, FIG. 5 is a cross-sectional diagram taken along a line B-B in FIG. 4, and FIG. 6 is a cross-sectional diagram illustrating a modification of the positive electrode. Referring to FIG. 4 and FIG. 5, a positive electrode 20 has a structure including a positive electrode current collector 21 and a positive electrode mixture layer 22 formed on the positive electrode current collector 21.

The shape of the positive electrode 20 is not particularly limited and can be appropriately selected according to the purpose. For example, a flat-plate shape can be mentioned.

The size of the positive electrode 20 can be made smaller than the size of the negative electrode 10, for example.

In the positive electrode 20, like the negative electrode 10, an insulating layer 23 may be formed on the positive electrode mixture layer 22 (FIG. 6). The thickness of the insulating layer 23 formed on the upper surface of the positive electrode mixture layer 22 is not particularly limited and can be appropriately selected according to the purpose. However, the thickness is preferably 0.5 μm or more for exhibiting safety effects, and preferably 24 μm or less from the viewpoint of preventing deterioration of the battery characteristics.

Note that, in FIG. 1, the insulating layer 13 formed on the negative electrode mixture layer 12 is in a solid pattern, and in FIG. 6, the insulating layer 23 formed on the positive electrode mixture layer 22 is in a solid pattern.

The insulating layers 13 and 23 can be drawn, for example, by an inkjet method. However, the insulating layers 13 and 23 are not limited to the solid pattern, and the insulating layers 13 and 23 may be drawn in a line pattern illustrated in FIG. 7, a lattice pattern illustrated in FIG. 8, or any other patterns.

Figure 7:
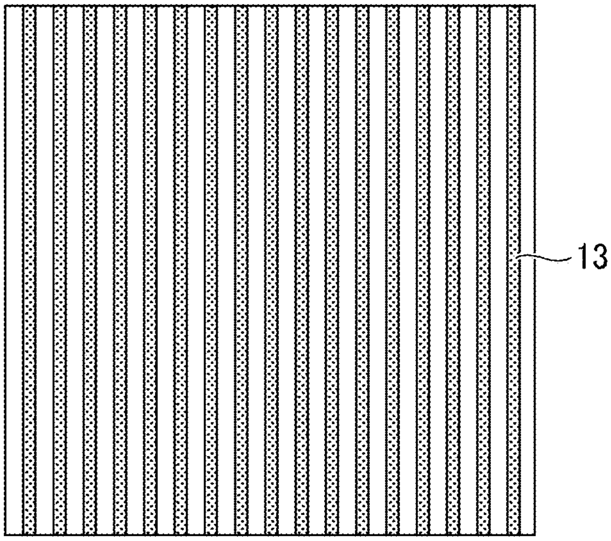
FIG. 7 is a diagram illustrating an example of a pattern of an insulating layer formed on the negative electrode mixture layer.
Figure 8:
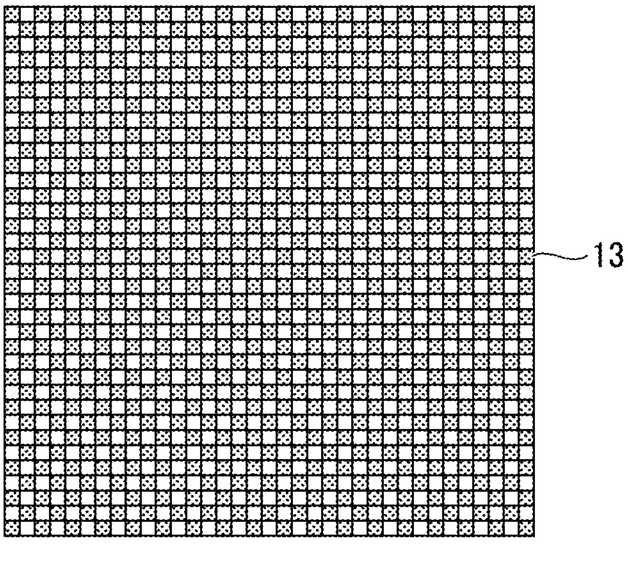
FIG. 8 is a diagram illustrating an example of a pattern of an insulating layer formed on a negative electrode mixture layer.

The patterns of the insulating layers 13 and 23 can be drawn based on bitmap information, for example. The bitmap information is digital image information used in the normal digital printing. FIG. 1 and FIG. 4 are based on the bitmap information with 100% density, and FIG. 7 and FIG. 8 are based on the bitmap information with 50% density. Note that the bitmap image pattern with 50% density may be a pattern other than the bitmap image patterns illustrated in FIG. 7 and FIG. 8.

<<Electrochemical Element>>

Figure 9:
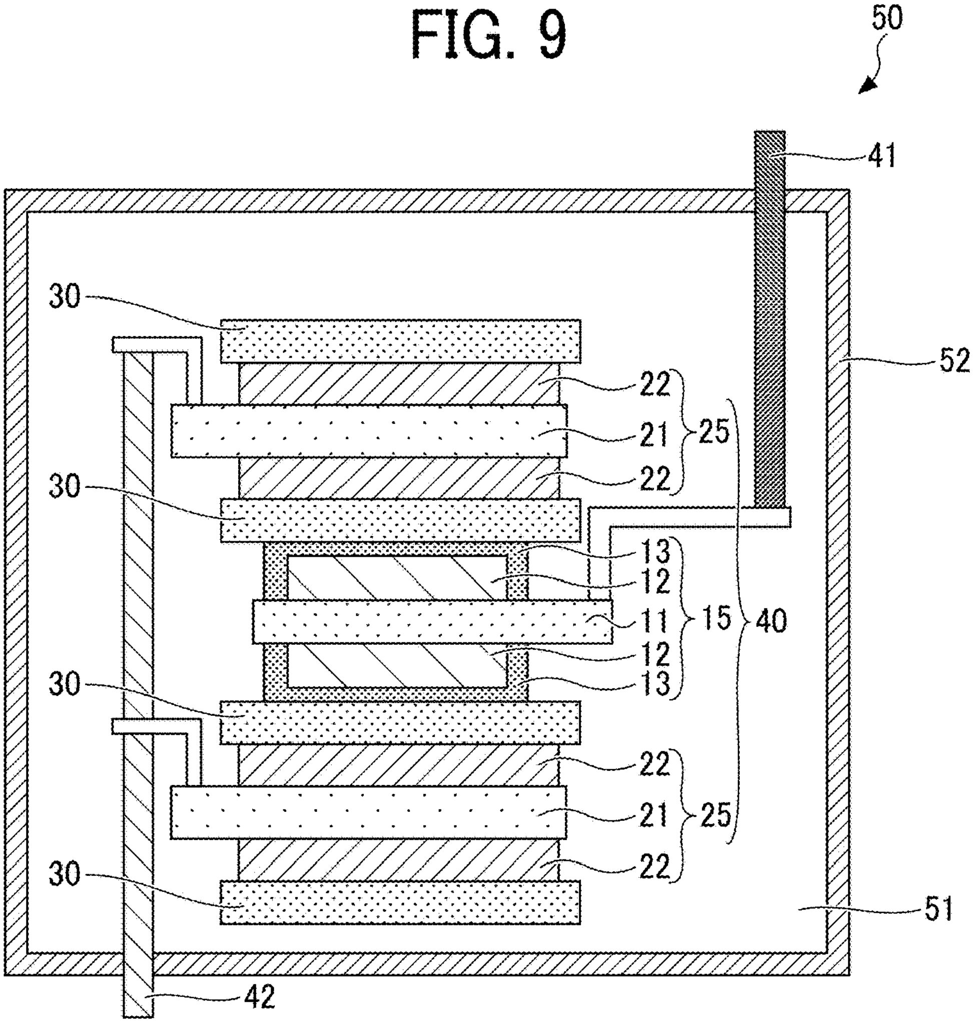
FIG. 9 is a schematic diagram illustrating an example of an electrochemical element.

FIG. 9 is a schematic diagram illustrating an example of an electrochemical element. Referring to FIG. 9, an electrode element 40 is an example of an electrode element according to the present embodiment, and the electrode element 40 is configured as a part of an electrochemical element 50 in which an electrolyte layer 51 is constituted of an electrolyte aqueous solution or a non-aqueous electrolyte and sealed with an exterior 52.

The electrode element 40 includes a structure in which a negative electrode 15 and a positive electrode 25 are laminated while being insulated from each other. In the example of FIG. 9, the positive electrodes 25 are laminated on both sides of the negative electrode 15 via separators 30. The separators 30 are disposed on both sides of the positive electrodes 25 on the further outside for insulation from the exterior 52 when the electrode element is formed.

A negative electrode lead wire 41 is connected to the negative electrode current collector 11 and is led out of the exterior 52. A positive electrode lead wire 42 is connected to the positive electrode current collectors 21 and is led out of the exterior 52.

The negative electrode 15 is different from the negative electrode 10 (refer to FIG. 1 and FIG. 2) in that the negative electrode mixture layers 12 and the insulating layers 13 are formed on both sides of the negative electrode current collector 11, and other configurations are the same as the negative electrode 10. Further, the positive electrodes 25 may have the positive electrode mixture layers 22 and the insulating layers 23 formed on both sides of the positive electrode current collectors 21 like the negative electrode 15.

Note that, in the electrode element 40, the number of layers of the negative electrode and the positive electrode 25 can be freely determined. That is, although FIG. 9 illustrates a total of three layers of one negative electrode 15 and two positive electrodes 25, the configuration is not limited to this number, and more negative electrodes 15 and positive electrodes 25 can be laminated. In such a case, the number of the negative electrode 15 and the number of the positive electrode 25 may be the same.

Note that the electrochemical element of the present embodiment may include other members as necessary.

The shape of the electrochemical element of the present embodiment is not particularly limited, and examples of the shape include, but are not limited to, a laminate type, a cylinder type in which a sheet electrode and a separator are spirally formed, a cylinder type with an inside-out structure in which a pellet electrode and a separator are combined, and a coin type in which a pellet electrode and a separator are laminated.

Examples of the electrochemical element of the present embodiment include, but are not limited to, an aqueous electrochemical element and a non-aqueous electrochemical element.

<<Separator>>

The separator 30 is disposed between the negative electrode 15 and the positive electrode 25 as necessary to prevent a short circuit between the negative electrode 15 and the positive electrode 25.

The separator is, for example, a porous film having communicating pores for insulating and isolating the positive electrode and the negative electrode used in the electrochemical element such as a secondary battery.

Examples of the separator include, but are not limited to, paper such as kraft paper, vinylon mixed paper, or synthetic pulp mixed paper, cellophane, a polyethylene graft film, polyolefin non-woven fabric such as polypropylene melt-blown non-woven fabric, polyamide non-woven fabric, glass fiber non-woven fabric, and a micropore film.

The size of the separator is not particularly limited as long as the separator can be used in the electrochemical element.

The separator may have a single-layer structure or a laminated structure.

Note that the separator 30 can be omitted in a case where a solid electrolyte is used as the non-aqueous electrolyte.

The separator according to the present embodiment includes the insulating layer, including the insulating material described above, on at least one main surface of the separator, and the insulating layer may include at least one cross-linked resin having the repeating structural unit represented by the general formula (1) or (2) described above.

Further, in the separator of the present embodiment, the cross-linked resin having the repeating structural unit represented by the general formula (1) or (2) described above can be formed by reaction (i.e., a reaction product) of the resin having the repeating structural unit represented by the general formula (3) described above (hereinafter sometimes referred to as a resin of the general formula (3)) and the resin represented by the general formula (5) described above (sometimes referred to as a resin of the general formula (5)).

Examples of an electrolyte salt constituting the electrolyte aqueous solution include, but are not limited to, sodium hydroxide, potassium hydroxide, sodium chloride, potassium chloride, ammonium chloride, zinc chloride, zinc acetate, zinc bromide, zinc iodide, zinc tartrate, and zinc perchloride.

A solid electrolyte or a non-aqueous electrolytic solution can be used as the non-aqueous electrolyte. The non-aqueous electrolytic solution described herein is an electrolytic solution in which the electrolyte salt is dissolved in a non-aqueous solvent.

The non-aqueous solvent is not particularly limited. For example, an aprotic organic solvent is preferably used as the non-aqueous solvent.

As the aprotic organic solvent, a carbonate-based organic solvent such as a chain carbonate or a cyclic carbonate can be used. Among these carbonate-based organic solvents, a chain carbonate is preferable in terms of high dissolving ability for the electrolyte salt. Further, the aprotic organic solvent preferably has a low viscosity.

Examples of the chain carbonate include, but are not limited to, dimethyl carbonate (DMC), diethyl carbonate (DEC), and methyl ethyl carbonate (EMC).

The content of the chain carbonate in the non-aqueous solvent is preferably 50% by mass or more.

In a case where the content of the chain carbonate in the non-aqueous solvent is 50% by mass or more, even if the non-aqueous solvent other than the chain carbonate is a cyclic substance with the high dielectric constant (e.g., a cyclic carbonate or a cyclic ester), the content of the cyclic substance becomes low. Thus, even if the non-aqueous electrolytic solution with a high concentration of 2M or more is produced, the viscosity of the non-aqueous electrolytic solution is kept low, and penetration of the non-aqueous electrolytic solution into the electrode and ion diffusion are improved.

Examples of the cyclic carbonate include, but are not limited to, propylene carbonate (PC), ethylene carbonate (EC), butylene carbonate (BC), and vinylene carbonate (VC).

Note that, as the non-aqueous solvent other than the carbonate-based organic solvent, for example, an ester-based organic solvent such as a cyclic ester or a chain ester, an ether-based organic solvent such as a cyclic ether or a chain ether, and the like can be used.

Examples of the cyclic ester include, but are not limited to, γ-butyrolactone (γBL), 2-methyl-γ-butyrolactone, acetyl-γ-butyrolactone, and γ-valerolactone.

Examples of the chain ester include, but are not limited to, a propionic acid alkyl ester, a malonic acid dialkyl ester, an acetic acid alkyl ester (e.g., methyl acetate (MA) and ethyl acetate), and a formic acid alkyl ester (e.g., methyl formate (MF) and ethyl formate).

Examples of the cyclic ether include, but are not limited to, tetrahydrofuran, an alkyltetrahydrofuran, an alkoxytetrahydrofuran, a dialkoxytetrahydrofuran, 1,3-dioxolane, an alkyl-1,3-dioxolane, and 1,4-dioxolane.

Examples of the chain ether include, but are not limited to, 1,2-dimethoxyethane (DME), diethyl ether, an ethylene glycol dialkyl ether, a diethylene glycol dialkyl ether, a triethylene glycol dialkyl ether, and a tetraethylene glycol dialkyl ether.

There is no particular limitation on the electrolyte salt that constitutes the non-aqueous electrolyte, as long as the electrolyte salt has high ionic conductivity and can be dissolved in the non-aqueous solvent.

Such an electrolyte salt preferably includes a halogen atom. Further, the electrolyte salt preferably includes a cation or an anion.

Examples of the cation that constitutes the electrolyte salt include, but are not limited to, a lithium ion that constitutes a lithium salt.

The lithium salt is not particularly limited and can be appropriately selected according to the purpose. Examples of the lithium salt include, but are not limited to, lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis(trifluoromethylsulfonyl)imide ($LiN(CF_3SO_2)_2$), and lithium bis(pentafuluoroethylsulfonyl)imide ($LiN(C_2F_5SO_2)_2$). Among these lithium salts, $LiPF_6$ is preferable in terms of ionic conductivity, and $LiBF_4$ is preferable in terms of stability.

Examples of the anion constituting the electrolyte salt include, but are not limited to, $BF_4^-$, $PF_6^-$, $AsF_6^-$, $CF_3SO_3^-$, $(CF_3SO_2)_2N^-$, and $(C_2F_5SO_2)_2N^-$.

Note that these electrolyte salts may be used singly or in combination of two or more kinds.

The concentration of the electrolyte salt in the non-aqueous electrolytic solution can be appropriately selected according to the purpose. However, from the viewpoint of the battery characteristics, the concentration is preferably 1 mol/L to 2 mol/L in a case where the non-aqueous electrochemical element is a swing type, and preferably 2 mol/L to 4 mol/L in a case where the non-aqueous electrochemical element is a reserve type.

<<Usage of Electrochemical Element>>

There is no particular limitation on the usage of the electrochemical element according to the present embodiment. However, in a case of incorporating the electrochemical element according to the present embodiment in a secondary battery, examples of the usage include, but are not limited to, a laptop computer, a pen-input personal computer, a mobile personal computer, an e-book reader, a cell phone, a portable fax machine, a portable copying machine, a portable printer, a stereo headphone, a video player, a liquid crystal television, a handheld vacuum cleaner, a portable CD player, a MiniDisc player, a transceiver, an electronic diary, a calculator, a memory card, a portable tape recorder, a radio, a backup power supply, a motor, a lighting device, a toy, a game console, a clock/watch, an electronic flash, a camera, and an electric vehicle.

<<Liquid Composition>>

A liquid composition according to the first embodiment includes the insulating material described above, the resin having the repeating structural unit represented by the general formula (3) described above, and the resin represented by the general formula (5) described above.

The insulating material included in the liquid composition of the first embodiment is preferably an inorganic oxide, and more preferably $\alpha$-alumina as the inorganic oxide.

Note that "R2" in the general formula (5) described above is preferably a poloxamer.

Here, the resin included in the liquid composition preferably has a number average molecular weight (Mn) of 1000 to 100000. In a case where the number average molecular weight (Mn) is in such a range, the viscosity of the liquid composition can be lowered, and the liquid composition can be used, for example, in an inkjet method.

The liquid composition further includes a dispersion medium. The dispersion medium described herein refers to water or a non-aqueous solvent. Note that, in the positive electrode material, deterioration of the battery characteristics is predicted due to reaction with water, thus the dispersion medium is preferably a non-aqueous solvent.

Examples of the non-aqueous solvent include, but are not limited to, styrene, toluene, xylene, methyl ethyl ketone, ethyl acetate, acetone, methanol, ethanol, n-propanol, isopropanol (IPA), n-butanol, isobutanol, tert-butanol, n-pentanol, n-hexanol, diacetone alcohol, N,N-dimethylformamide (DMF), N,N-dimethylsulfoxide (DMSO), N-methylpyrrolidone (NMP), and tetrahydrofuran (THF). The dispersion medium can be used singly or in combination of two or more kinds of solvents.

From the viewpoint of uniform film formation, the concentration of the insulating material in the liquid composition is preferably 10% by mass or more, more preferably 20% by mass or more. Note that the concentration of the insulating material in the liquid composition is preferably 60% by mass or less from the viewpoint of the viscosity of the liquid composition, and more preferably 55% by mass or less from the viewpoint of inkjet ejection.

The liquid composition of the present embodiment may further include a surfactant, a pH adjuster, a rust inhibitor, a preservative, an antifungal agent, an antioxidant, a reduction inhibitor, an evaporation accelerator, a chelating agent, and the like for the purpose of viscosity adjustment, particle diameter adjustment, surface tension adjustment, non-aqueous solvent evaporation control, additive solubility improvement, material dispersibility improvement, sterilization, and the like.

Note that, in this specification, the particle diameter refers to the particle diameter (median diameter) that divides the particle diameter distribution into two equal amounts of larger and smaller particles dispersed in the liquid. A method for measuring the particle diameter distribution is not particularly limited, and examples of the method include, but are not limited to, a dynamic light scattering method/photon correlation method, laser diffraction, a centrifugal sedimentation method, and an induced diffraction method.

In the liquid composition of the present embodiment, the mass ratio of the resin having the repeating structural unit represented by the general formula (3) described above relative to the insulating material is 1% or more and 15% or less, preferably 1.5% or more and 12% or less, more preferably 2% or more and 10% or less. Further, the mass ratio of the resin having the repeating structural unit represented by the general formula (5) described above relative to the insulating material is 0.1% or more and 5% or less, preferably 0.3% or more and 4% or less, more preferably 0.5% or more and 3% or less.

<<Production Method of Liquid Composition>>

The liquid composition of the present embodiment can be produced using a dispersing device. Examples of the dispersing device include, but are not limited to, a stirrer, a ball mill, a bead mill, a ring mill, a high-pressure disperser, a rotary high shearing device, and an ultrasonic disperser. The liquid composition of the present embodiment can be used singly, or the multiple liquid compositions can be used in combination.

<<Use Method of Liquid Composition>>

The liquid composition of the present embodiment is used by being applied to a medium to be coated.

The medium to be coated described herein is a medium (porous body) capable of absorbing the liquid composition of the present embodiment. Examples of the medium to be coated include, but are not limited to, a media in which an ink-receiving layer is formed by applying a porous material to plain paper or base paper.

Further, in a case where the electrode having the electrode mixture layer formed on the current collector is used as the medium to be coated, an insulating layer-integrated electrode or the like can be produced.

Examples of the medium to be coated other than the above include, but are not limited to, a base layer used in a reflective display element and an electrode layer used in printed electronics.

Examples of a method for applying the liquid composition include, but are not limited to, a dip coating method, a spray coating method, a spin coating method, a bar coating method, a slot die coating method, a doctor blade coating method, an offset printing method, a gravure printing method, a flexographic printing method, a letterpress printing method, a screen printing method, a liquid ejection method, and an electrophotographic printing method by a liquid development system. Among these methods, a liquid ejection method is preferable because the droplet ejection position and ejection amount can be precisely controlled.

In a case where the liquid ejection method is used, the liquid composition is ejected onto the medium to be coated from a liquid ejection head.

Examples of a method of ejecting the liquid composition include, but are not limited to, a method of applying mechanical energy to the liquid composition and a method of applying thermal energy to the liquid composition. Among these methods, in a case where the non-aqueous solvent is used, a method of applying mechanical energy to the liquid composition is preferable.

Note that, in the case of using the liquid ejection method, a known liquid ejection device can be used.

<<Production Method of Electrode>>

A method for producing an electrode according to the present embodiment includes an application process of applying the liquid composition onto the electrode mixture layer, including the active material, disposed on the current collector. Further, in the application process, the liquid composition may be discharged by an inkjet method. Further, after the application process, a heating process of heating and drying the electrode mixture layer may be included. The method for producing the electrode of the present embodiment is achieved, for example, by using an electrode production apparatus described below.

<<Electrode Production Apparatus>>

Figure 10:
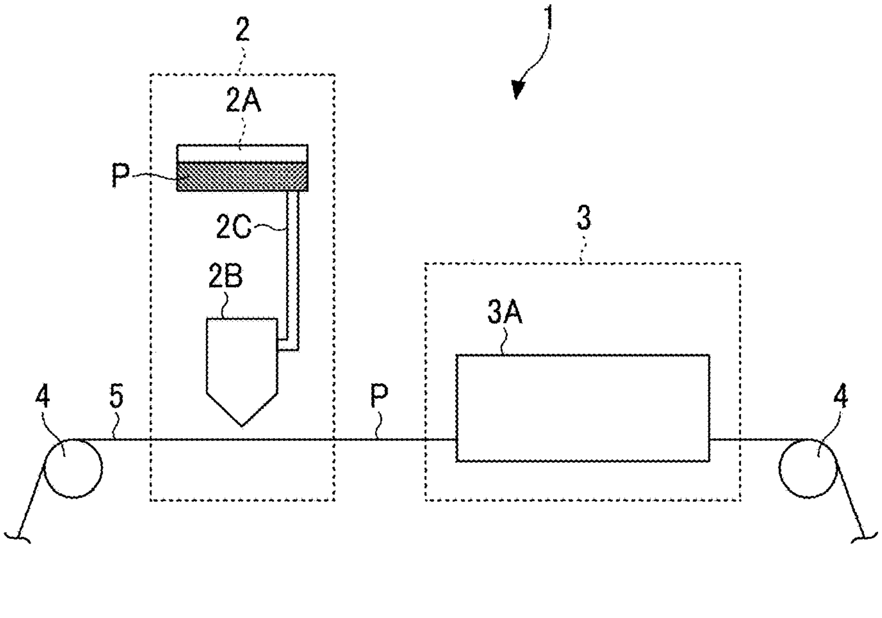
FIG. 10 a schematic diagram illustrating an example of a configuration of an electrode production apparatus.

FIG. 10 is a schematic diagram illustrating an example of a configuration of the electrode production apparatus that achieves the method for producing the electrode according to the present embodiment. As illustrated in FIG. 10, an electrode production apparatus 1 produces the electrode by using an electrode liquid composition P, which is an example of the liquid composition according to the present embodiment.

The electrode production apparatus 1 includes a printing unit 2, a heating unit 3, and a conveying unit 4. Note that the printing unit 2 performs the application process that constitutes the method for producing the electrode of the present embodiment, and the heating unit 3 performs the heating process that constitutes the method for producing the electrode of the embodiment.

The printing unit 2 applies the electrode liquid composition P onto a medium 5 to be coated to form an electrode liquid composition layer. The printing unit 2 includes a storage container 2A for storing the electrode liquid composition P, a printing section 2B, which is an application section that applies the electrode liquid composition P onto the medium 5 to be coated, and a supply tube 2C for supplying the electrode liquid composition P stored in the storage container 2A to the printing section 2B.

During printing, the printing unit 2 supplies the electrode liquid composition P stored in the storage container 2A to the printing section 2B and ejects the electrode liquid composition P onto the medium 5 to be coated from the printing section 2B. In this manner, the electrode liquid composition P is applied onto the medium 5 to be coated, and the electrode liquid composition layer is formed as a thin film.

The storage container 2A can be freely selected as long as the storage container 2A can stably store the electrode liquid composition P. Note that the storage container 2A may be integrated with the electrode production apparatus 1 or may be detachable from the electrode production apparatus 1. Further, the storage container 2A may be a container used for filling a storage container integrated with the electrode production apparatus 1 or a container used for filling a storage container detachable from the electrode production apparatus 1.

The printing section 2B is not particularly limited as long as the printing section 2B can apply the electrode liquid composition P. For example, as the printing section 2B, any printing sections can be used according to various printing methods, such as a spin coating method, a casting method, a micro gravure coating method, a gravure coating method, a bar coating method, a roll coating method, a wire bar coating method, a dip coating method, a slit coating method, a capillary coating method, a spray coating method, a nozzle coating method, a gravure printing method, a screen printing method, a flexographic printing method, an offset printing method, a reversal printing method, and an inkjet printing method. Among these methods, a printing section according to an inkjet printing method is preferably used in terms of allowing non-contact formation or printing of a thin film on a thin-layer base material, a reduction in material costs, a reduction in waste materials, and the like.

The supply tube 2C can be freely selected as long as the supply tube 2C can stably supply the electrode liquid composition P.

The heating unit 3 heats the electrode liquid composition P to obtain a porous resin. The heating unit 3 includes a heating section 3A as illustrated in FIG. 10.

The heating section 3A heats and dries the electrode liquid composition P, thereby removing the solvent remaining in the electrode liquid composition P. In this manner, the electrode liquid composition layer on the medium 5 to be coated becomes an insulating layer to form an electrode in which the insulating layer is disposed on the electrode mixture layer.

The heating unit 3 may heat the solvent remaining in the electrode liquid composition P under reduced pressure.

The heating unit 3 removes the solvent by heating and drying the electrode liquid composition P using the heating section 3A.

The heating unit 3 preferably performs heating under reduced pressure after heating the solvent included in the electrode liquid composition P.

The heating section 3A is not particularly limited as long as the heating section 3A satisfies the above functions, and for example, an IR heater, a hot air heater, or the like can be used as the heating section 3A.

Further, the heating temperature and the heating time can be appropriately selected according to the boiling point of the solvent included in the electrode liquid composition P, the thickness of the formed film, and the like.

The conveying unit 4 conveys the medium 5 to be coated from the printing unit 2 to the heating unit 3 at a preset speed. The conveying unit 4 may be any unit as long as the unit can convey the medium 5 to be coated, and for example, a conveying belt or the like can be used.

As a material of the medium 5 to be coated, any material can be used regardless of whether the material is transparent or opaque. That is, as a transparent base material for the medium 5 to be coated, a glass base material, a resin film base material such as various plastic films, a composite base material of the above base materials, and the like can be used. As an opaque base material, various base materials such as a silicon base material, a metal base material such as stainless steel, and a laminate of the above base materials can be used.

Note that the medium 5 to be coated may be a recording medium such as plain paper, glossy paper, special paper, or cloth. The recording medium may be a low-permeability base material (low absorptive base material). The low-permeability base material refers to a base material having a surface with low water permeability or adsorption and also includes a material having a number of hollow spaces inside but not opened to the outside. Examples of the low-permeability base material include, but are not limited to, coated paper used in commercial printing and a recording medium such as paperboard prepared by blending waste paper pulp in the middle and back layers, followed by surface coating.

The medium 5 to be coated may be a porous resin sheet (e.g., a separator) used as an insulating layer for an electrochemical element or a power generating element.

The shape of the medium 5 to be coated may be curved or uneven, and any base material applicable to the printing unit 2 can be used.

Further, in the case where the electrode having the electrode mixture layer formed on the current collector is used as the medium 5 to be coated, an insulating layer-integrated electrode or the like can be produced. In this case, the electrode mixture layer and the insulating layer may be formed on one side of the current collector or may be formed on both sides of the current collector.

Examples of the medium to be coated other than the above include, but are not limited to, a base layer used in a reflective display element and an electrode layer used in printed electronics.

Note that the liquid composition according to the present embodiment may be formed by applying the electrode liquid composition P onto the electrode mixture layer (e.g., the negative electrode mixture layer 12 or the positive electrode mixture layer 22) using a coating device instead of the electrode production apparatus described above.

The coating device of the liquid composition according to the present embodiment is not particularly limited, and any printing section can be used as appropriate. Examples of the coating device include, but are not limited to, planographic printing, letterpress printing, intaglio printing, stencil printing, dipping, comma coater, die coater, curtain coater, spray coater, and inkjet. Among these coating devices, inkjet printing is preferable in terms of allowing non-contact formation or printing of a thin film on a thin-layer base material, a reduction in material costs, a reduction in waste materials, and the like.

<<Production Method of Separator>>

A method for producing a separator according to the present embodiment includes an application process of applying the liquid composition described above onto at least one main surface of the separator. Further, in the application process, the liquid composition is ejected by an inkjet method. Further, after the application process, a heating process of heating and drying the separator is included. The method for producing the separator of the present embodiment can be achieved by using the above-mentioned device in the same manner as the method for producing the electrode described above.

As described above, in the first embodiment, the insulating layer disposed on the electrode mixture layer includes at least one resin having the repeating structural unit represented by the general formula (1), (2), (3) or (4) described above, making it possible to provide the electrode with which the electrochemical element with high input/output characteristics and high safety can be obtained.

Further, as described above, the resin having the repeating structural unit represented by the general formula (1) or (2) described above is formed by reaction of the resin having the repeating structural unit represented by the general formula (3) described above and the resin represented by the general formula (5) described above, making it possible to provide the electrode in which the insulating layer including the resin having the repeating structural unit represented by the general formula (1) or (2) is formed on the electrode mixture layer.

Further, "R" in the general formula (1) or (2) is the poloxamer, making it possible to provide the electrode that improves the input/output characteristics and safety of the electrochemical element.

Further, as described above, "R2" in the general formula (5) is the poloxamer, making it possible to provide the electrode in which "R" in the general formula (1) or (2) is the poloxamer.

Further, as described above, the mass ratio of the resin having the repeating structural unit represented by the general formula (1) or (2) relative to the insulating material is 1.5% or more and 15% or less, making it possible to provide the electrode that improves the input/output characteristics and safety of the electrochemical element.

Further, as described above, the average value of the coverage ("average coverage") of the insulating layer for the electrode mixture layer is 70% or more, making it possible to provide the electrode capable of preventing leakage current and improving heat resistance while maintaining the high input/output characteristics of the electrochemical element.

Further, as described above, the basis weight of the insulating layer for the electrode mixture layer is 0.3 $mg/cm^2$ or more and 1.5 $mg/cm^2$ or less, making it possible to provide the electrode capable of further preventing leakage current and improving heat resistance while maintaining the high input/output characteristics of the electrochemical element.

Further, as described above, the insulating material included in the insulating layer is the inorganic oxide, making it possible to provide the electrode that improves the heat resistance of the electrochemical element using the electrode including such an insulating layer.

Further, as described above, the inorganic oxide included in the insulating layer as the insulating material is α-alumina, making it possible to provide the electrode that further improves the heat resistance of the electrochemical element using the electrode including such an insulating layer.

Further, as described above, using the electrode according to the present embodiment in the electrochemical element makes it possible to provide the electrochemical element with the high input/output characteristics and the high safety.

Further, using the electrochemical element according to the present embodiment described above in a secondary battery makes it possible to provide the secondary battery with the high input/output characteristics and the high safety.

Further, as described above, the separator according to the present embodiment includes the insulating layer, including the insulating material, on at least one main surface of the separator, and the insulating layer includes at least one resin having the repeating structural unit represented by the general formula (1) or (2) described above, making it possible to provide the separator with which the electrochemical element with the high input/output characteristics and the high safety can be obtained.

Further, as described above, the resin having the repeating structural unit represented by the general formula (1) or (2) described above is formed by reaction of the resin having the repeating structural unit represented by the general formula (3) described above and the resin represented by the general formula (5) described above, making it possible to provide the separator in which the insulating layer including the resin having the repeating structural unit represented by the general formula (0) or (2) is formed on the electrode mixture layer.

Further, as described above, the liquid composition according to the first embodiment includes the insulating material, the resin having the repeating structural unit represented by the general formula (3) described above, and the resin represented by the general formula (5) described above.

This allows the liquid composition of the first embodiment to be used in the production of the electrode in which the insulating layer including the resin having the repeating structural unit represented by the general formula (1) or (2) described above is formed on the electrode mixture layer. Thus, the liquid composition can be used to produce the electrode that improves the input/output characteristics and safety of the electrochemical element.

Further, since such a liquid composition has a low viscosity, a thin film can be formed or printed on the base material. Thus, the insulating layer produced using this liquid composition can be provided with high peel strength.

Further, as described above, in the liquid composition, "R2" in the general formula (5) is the poloxamer, making it possible to use the liquid composition in the production of the electrode in which "R" in the general formula (1) or (2) is the poloxamer.

Further, as described above, in the liquid composition, the mass ratio of the resin having the repeating structural unit represented by the general formula (3) described above relative to the insulating material is 1% or more and 15% or less, and the mass ratio of the resin having the repeating structural unit represented by the general formula (5) described above relative to the insulating material described above is 0.5% or more and 3% or less, making it possible to use the liquid composition in the production of the electrode that improves the input/output characteristics and safety of the electrochemical element.

Further, as described above, in the liquid composition, the insulating material is the inorganic oxide, making it possible to produce the electrode that improves the heat resistance of the electrochemical element.

Further, as described above, in the liquid composition, the inorganic oxide included in the insulating layer as the insulating material is α-alumina, making it possible to produce the electrode that further improves the heat resistance of the electrochemical element.

Further, as described above, the method for producing the electrode according to the present embodiment includes the application process of applying the liquid composition described above onto the electrode mixture layer, including the active material, disposed on the current collector, making it possible to produce the electrode with which the electrochemical element with the high input/output characteristics and the high safety can be obtained.

Further, as described above, in the method for producing the electrode according to the present embodiment, the liquid composition described above is discharged by the inkjet method in the application process, thereby allowing non-contact formation or printing of a thin film on the base material, which makes it possible to provide the insulating layer disposed on the electrode mixture layer with the high peel strength while reducing the material costs and the waste materials.

Further, as described above, the method for producing the electrode according to the present embodiment includes the heating process of heating and drying the electrode mixture layer after the application process, making it possible to remove the solvent of the liquid composition remaining in the insulating layer formed on the electrode mixture layer. This facilitates formation of the porous layer inside the insulating layer and makes it possible to produce the electrode with which the electrochemical element with the high input/output characteristics and the high safety can be obtained.

As described above, the method for producing the separator according to the present embodiment includes the application process of applying the liquid composition described above onto at least one main surface of the separator, making it possible to produce the separator with which the electrochemical element with the high input/output characteristics and the high safety can be obtained.

As described above, in the method for producing the separator according to the present embodiment, the liquid composition described above is discharged by the inkjet method in the application process, thereby allowing non-contact formation or printing of a thin film on the separator, which makes it possible to provide the insulating layer disposed on the separator with the high peel strength while reducing the material costs and the waste materials.

As described above, the method for producing the separator according to the present embodiment includes the heating process of heating and drying the electrode mixture layer after the application process, making it possible to remove the solvent of the liquid composition remaining in the insulating layer formed on the separator. This facilitates formation of the porous layer inside the insulating layer and makes it possible to produce the separator with which the electrochemical element with the high input/output characteristics and the high safety can be obtained.

Second Embodiment

Next, a second embodiment will be described. Note that, in the second embodiment, only parts different from the first embodiment will be described, and description of other parts will be omitted as they are the same as the first embodiment.

<<Electrode>>

In the electrode according to the second embodiment, the electrode mixture layer includes the positive electrode active material, and the insulating layer disposed on the electrode mixture layer includes at least one resin having the repeating structural unit represented by the general formula (3) or (4) described above.

Note that "A" in the general formula (4) preferably includes an ethyloxy group terminally protected by a hydroxyl group or an alkyl group having 1 to 4 carbon atoms.

The electrode of the present embodiment preferably includes a polymer compound having hydroxyl groups or amino groups at least at two or more terminals.

Such a polymer compound is preferably a poloxamer.

In the electrode of the present embodiment, the mass ratio of the resin having the repeating structural unit represented by the general formula (3) or (4) described above relative to the insulating material is 0.3% or more and 20% or less, preferably 0.5% or more and 18% or less, more preferably 1% or more and 15% or less.

In the electrode of the second embodiment, the average value of the coverage ("average coverage") of the insulating layer for the electrode mixture layer is 70% or more, preferably 80% or more, and more preferably 90% or more.

In the electrode of the second embodiment, the basis weight of the insulating layer for the electrode mixture layer is 0.3 $mg/cm^2$ or more and 1.5 $mg/cm^2$ or less, preferably 0.4 $mg/cm^2$ or more and 1.5 $mg/cm^2$ or less, more preferably 0.5 $mg/cm^2$ or more and 1.5 $mg/cm^2$ or less.

In the electrode according to the second embodiment, the insulating material included in the insulating layer is preferably an inorganic oxide, and more preferably α-alumina as the inorganic oxide.

Figure 11:
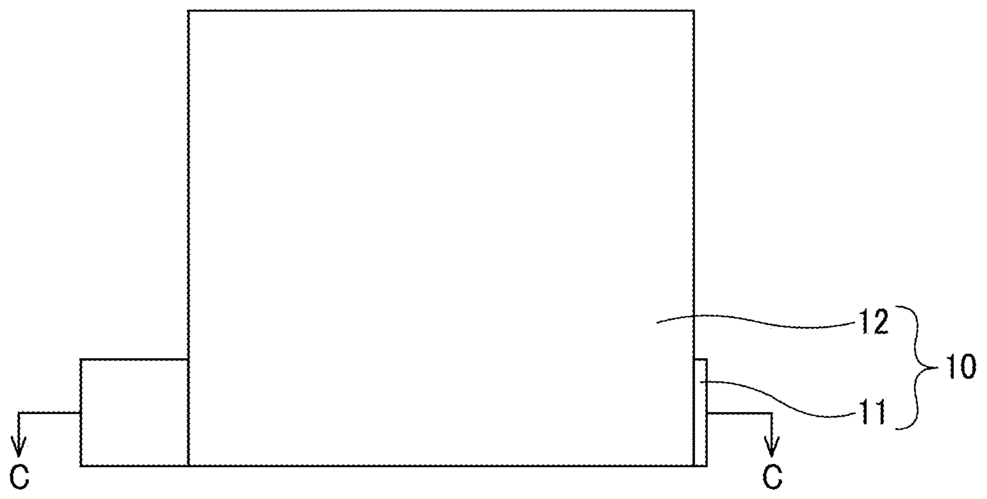
FIG. 11 is a schematic diagram illustrating an example of an electrode (negative electrode)
Figure 12:
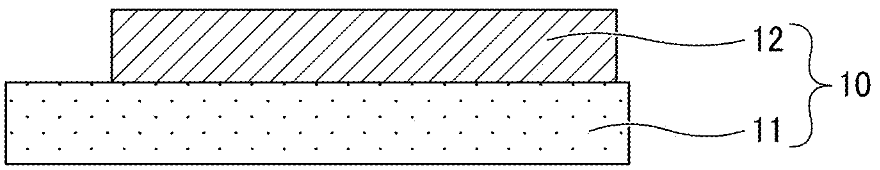
FIG. 12 is a cross-sectional view taken along a line C-C in FIG. 11.
Figure 13:
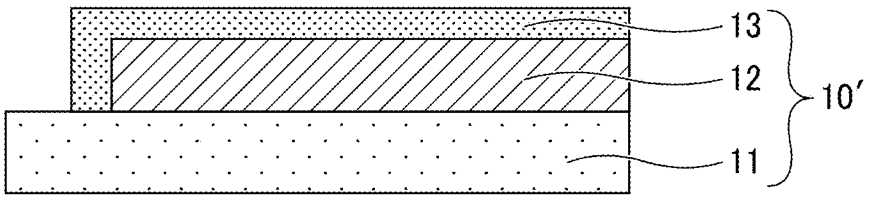
FIG. 13 is a cross-sectional view illustrating a modification of the negative electrode.

FIG. 11 is a schematic diagram of the negative electrode as an example of the electrode according to the second embodiment, FIG. 12 is a cross-sectional diagram taken along a line C-C in FIG. 11, and FIG. 13 is a cross-sectional diagram illustrating a modification of the negative electrode. Referring to FIG. 11 and FIG. 12, the negative electrode 10 has a structure including the negative electrode current collector 11 and the negative electrode mixture layer 12 formed on the negative electrode current collector 11.

The shape of the negative electrode 10 is not particularly limited and can be appropriately selected according to the purpose. For example, a flat-plate shape can be mentioned.

In the negative electrode 10', the insulating layer 13 may be formed on the negative electrode mixture layer 12 (FIG. 13). The thickness of the insulating layer 13 formed on the upper surface of the negative electrode mixture layer 12 is not particularly limited and can be appropriately selected according to the purpose. However, the thickness is preferably 0.5 μm or more for exhibiting safety effects, and preferably 24 μm or less from the viewpoint of preventing deterioration of the battery characteristics.

Figure 14:
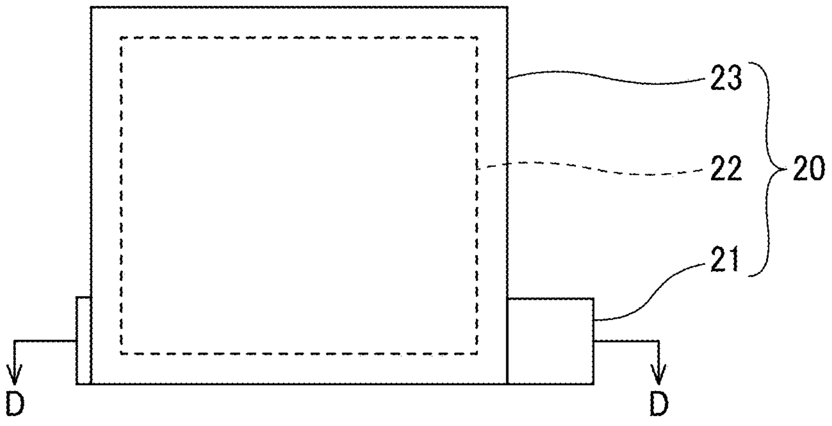
FIG. 14 is a schematic diagram illustrating an example of an electrode (positive electrode)
Figure 15:
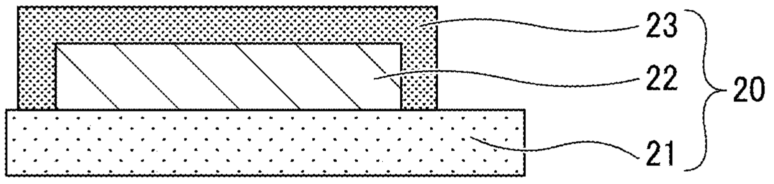
FIG. 15 is a cross-sectional view taken along a line D-D in FIG. 14.
Figure 16:
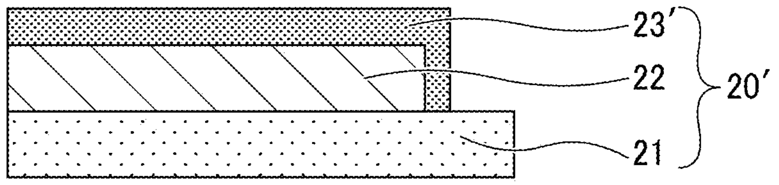
FIG. 16 is a cross-sectional view illustrating a modification of the positive electrode.

FIG. 14 is a schematic diagram of the positive electrode as an example of the electrode according to the second embodiment, FIG. 15 is a cross-sectional diagram taken along a line D-D in FIG. 14, and FIG. 16 is a cross-sectional diagram illustrating a modification of the positive electrode. Referring to FIG. 14, the positive electrode 20 has a structure including the positive electrode current collector 21 and the positive electrode mixture layer 22 formed on the positive electrode current collector 21.

The shape of the positive electrode 20 is not particularly limited and can be appropriately selected according to the purpose. For example, a flat-plate shape can be mentioned.

The size of the positive electrode 20 can be made smaller than the size of the negative electrode 10, for example.

In the positive electrode 20, the insulating layer 23 covers the positive electrode mixture layer 22 that faces the separator from the viewpoint of preventing oxidation deterioration of the separator, which will be described later. It is more preferably that the insulating layer 23 is formed so as to cover not only the facing surface but also a side surface of the positive electrode mixture layer 22.

Voids generated by deposition of the insulating material or a large number of gaps may be formed in the insulating layer 23 covering the positive electrode mixture layer 22. Further, the interface between the separator and the positive electrode mixture layer 22 is not in a state in which leakage current is generated due to excessive oxidization reaction of the separator during a float test, or in a state in which a short circuit occurs due to the shrinkage of the separator during a temperature rise test. Here, the large number of gaps are formed such that a non-covering region of the insulating layer 23 on the positive electrode mixture layer 22 is 50% or less, more preferably 30% or less.

In the positive electrode 20', like the negative electrode 10', the insulating layer 23' may be formed on the positive electrode mixture layer 22 (FIG. 16). The thickness of the insulating layer 23' formed on the upper surface of the positive electrode mixture layer 22 is not particularly limited and can be appropriately selected according to the purpose. However, the thickness is preferably 0.5 μm or more for exhibiting safety effects, and preferably 24 μm or less from the viewpoint of preventing deterioration of the battery characteristics.

Note that, in FIG. 13, the insulating layer 13 with a solid pattern is formed on the negative electrode mixture layer 12, and in FIG. 14, the insulating layer 23 with a solid pattern is formed on the positive electrode mixture layer 22.

The insulating layers 13 and 23 can be drawn, for example, by an inkjet method. However, the insulating layers 13 and 23 are not limited to the solid pattern and may be formed in a line pattern illustrated in FIG. 17, a grid pattern illustrated in FIG. 18, or any other patterns.

Figure 17:
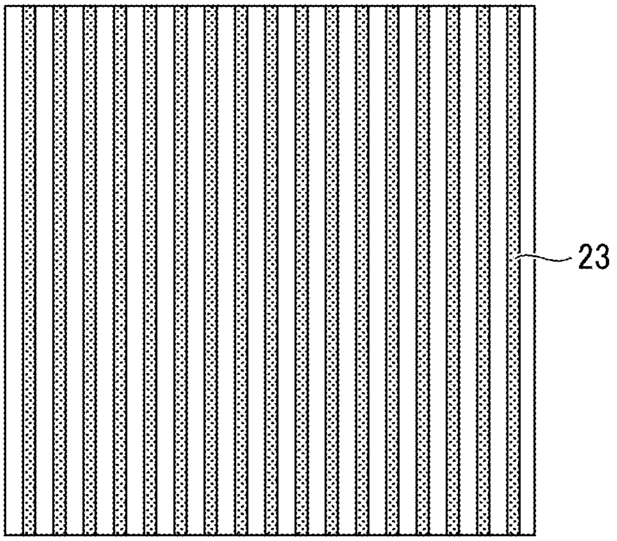
FIG. 17 is a diagram illustrating an example of a pattern of an insulating layer formed on a positive electrode mixture layer.
Figure 18:
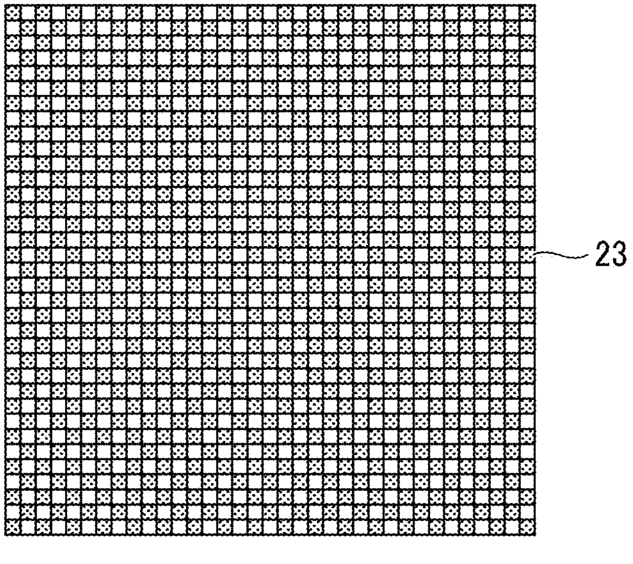
FIG. 18 is a diagram illustrating an example of a pattern of an insulating layer formed on a positive electrode mixture layer.

The patterns of the insulating layers 13 and 23 can be drawn based on bitmap information, for example. The bitmap information is digital image information used in the normal digital printing. FIG. 11 and FIG. 14 are based on the bitmap information with 100% density, and FIG. 17 and FIG. 18 are based on the bitmap information with 50% density. Note that the bitmap image pattern with 50% density may be a pattern other than the bitmap image patterns illustrated in FIG. 17 and FIG. 18.

<<Electrochemical Element>>

Figure 19:
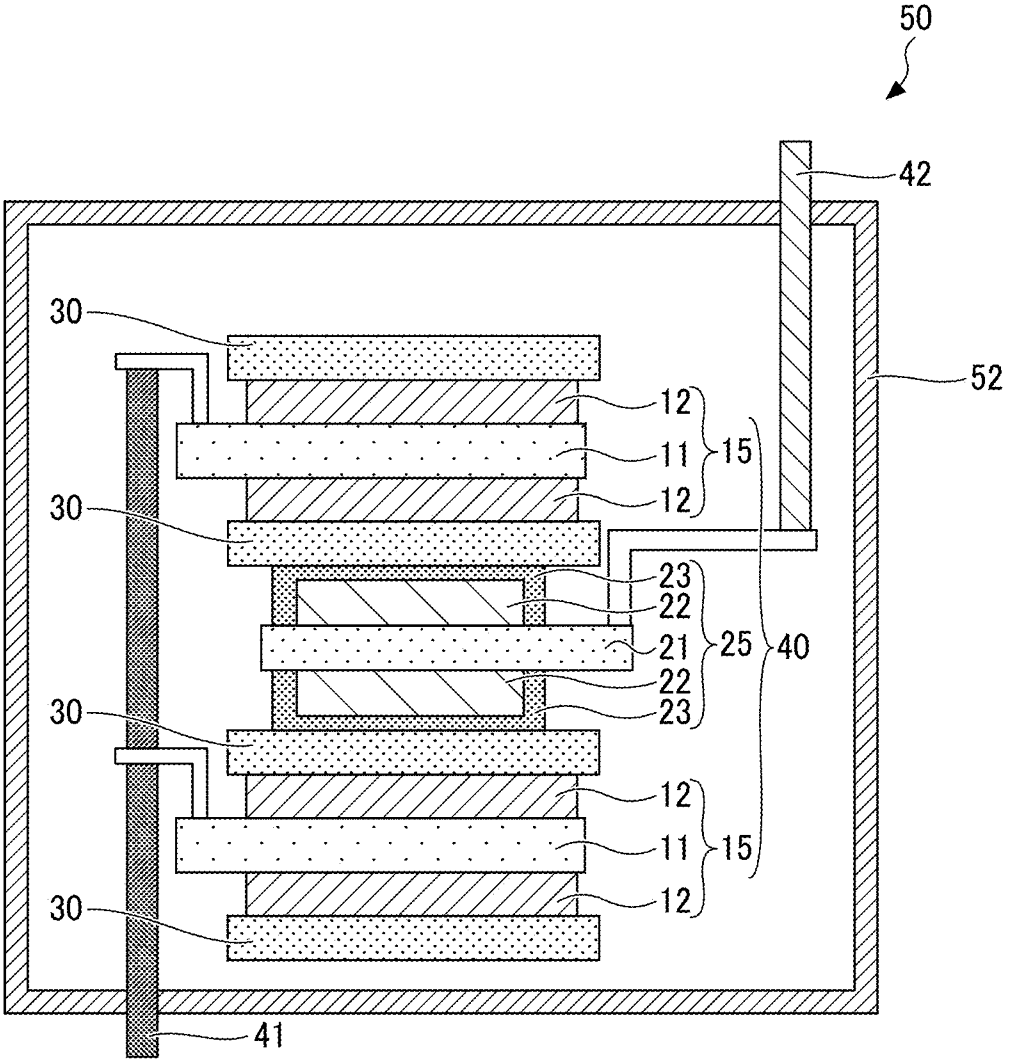
FIG. 19 is a schematic diagram illustrating an example of an electrochemical element.

FIG. 19 is a schematic diagram illustrating an example of the electrochemical element. Referring to FIG. 19, the electrode element 40 is an example of the electrode element according to the present embodiment, and the electrode element 40 is configured as a part of the electrochemical element 50 sealed with the exterior 52.

The electrode element 40 includes a structure in which the negative electrode 15 and the positive electrode 25 are laminated while being insulated from each other. In the example of FIG. 19, the negative electrodes 15 are laminated on both sides of the positive electrode 25 via the separators 30. The separators 30 are disposed on both sides of the negative electrodes on the further outside for insulation from the exterior 52 when the electrode element is formed.

The separator 30 is disposed between the negative electrode 15 and the positive electrode 25 as necessary to prevent a short circuit between the negative electrode 15 and the positive electrode 25.

A negative electrode lead wire 41 is connected to the negative electrode current collector 11 and is led out of the exterior 52. A positive electrode lead wire 42 is connected to the positive electrode current collectors 21 and is led out of the exterior 52.

The negative electrode 15 is different from the negative electrode 10 (refer to FIG. 11 and FIG. 12) in that the negative electrode mixture layers 12 are formed on both sides of the negative electrode current collector 11, and other configurations are the same as the negative electrode 10.

Further, the positive electrode 25 has the positive electrode mixture layers 22 and the insulating layers 23 formed on both sides of the positive electrode current collector 21 like the negative electrode 15.

Note that, in the electrode element 40, the number of layers of the negative electrode and the positive electrode 25 can be freely determined. That is, although FIG. 19 illustrates a total of three layers of two negative electrodes 15 and one positive electrode 25, the number of layers is not limited to this, and more negative electrodes 15 and positive electrodes 25 can be laminated. In such a case, the number of the negative electrode 15 and the number of the positive electrode 25 may be the same.

Figure 20:
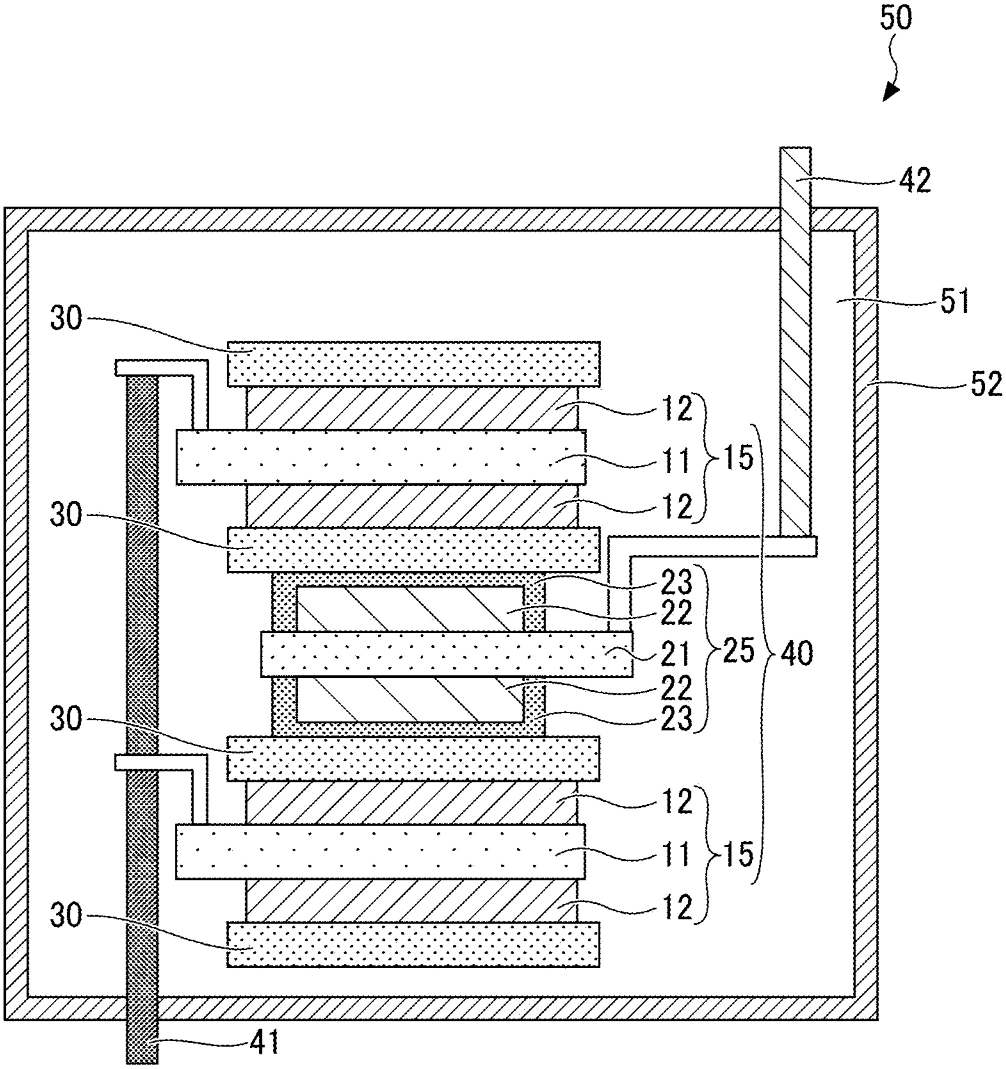
FIG. 20 is a schematic diagram illustrating an example of an electrochemical element.

FIG. 20 is a cross-sectional view illustrating an example of the electrochemical element 50 using the electrode element 40. Note that, in FIG. 20, parts common to the electrochemical element 50 in FIG. 19 are denoted by the same reference numerals as in FIG. 19, and description of the common parts is omitted.

Referring to FIG. 20, the electrochemical element 50 has a structure in which the non-aqueous electrolytic solution is injected into the electrode element 40 to form the electrolyte layer 51 and sealed with the exterior 52. In the electrochemical element 50, the positive electrode lead wire 42 and the negative electrode lead wire 41 are led out of the exterior 52.

The electrochemical element 50 may include other members as necessary. The electrochemical element 50 is not particularly limited and can be appropriately selected according to the purpose. Examples of the electrochemical element 50 include, but are not limited to, a non-aqueous electrolyte secondary battery and a non-aqueous electrolyte capacitor.

The shape of the electrochemical element 50 is not particularly limited and can be appropriately selected from various commonly used shapes according to the usage of the electrochemical element 50. Examples of the shape include, but are not limited to, a laminate type, a cylinder type in which a sheet electrode and a separator are spirally formed, a cylinder type with an inside-out structure in which a pellet electrode and a separator are combined, and a coin type in which a pellet electrode and a separator are laminated.

When used as the electrochemical element 50, the voids generated by the deposition of the insulating material and a large number of gaps may be formed in the insulating layer 23 covering the positive electrode mixture layer 22 so as not to hinder permeation of the electrolyte from the viewpoint of the input/output characteristics. The large number of gaps described herein are formed such that the non-covering region of the insulating layer 23 on the positive electrode mixture layer 22 is 50% or less, more preferably 30% or less.

Further, as described below, the interface between the separator and the negative electrode mixture layer 12 in the electrochemical element 50 is not in a state in which leakage current is generated due to excessive oxidization reaction of the separator during the float test, or in a state in which a short circuit occurs due to the shrinkage of the separator during the temperature rise test.

The shape of the electrochemical element of the present embodiment is not particularly limited, and examples of the shape include, but are not limited to, a laminate type, a cylinder type in which a sheet electrode and a separator are spirally formed, a cylinder type with an inside-out structure in which a pellet electrode and a separator are combined, and a coin type in which a pellet electrode and a separator are laminated.

Examples of the electrochemical element of the present embodiment include, but are not limited to, an aqueous electrochemical element and a non-aqueous electrochemical element.

<<Usage of Electrochemical Element>>

There is no particular limitation on the usage of the electrochemical element according to the present embodiment. However, in a case of incorporating the electrochemical element according to the present embodiment in a secondary battery, examples of the usage include, but are not limited to, a laptop computer, a pen-input personal computer, a mobile personal computer, an e-book reader, a cell phone, a portable fax machine, a portable copying machine, a portable printer, a stereo headphone, a video player, a liquid crystal television, a handheld vacuum cleaner, a portable CD player, a MiniDisc player, a transceiver, an electronic diary, a calculator, a memory card, a portable tape recorder, a radio, a backup power supply, a motor, a lighting device, a toy, a game console, a clock/watch, an electronic flash, a camera, and an electric vehicle.

<<Liquid Composition>>

The liquid composition according to the second embodiment includes the insulating material described above and at least one of the resin having the repeating structural unit represented by the general formula (3) described above or the resin represented by the general formula (4) described above.

The insulating material included in the liquid composition of the second embodiment is preferably an inorganic oxide, and more preferably α-alumina as the inorganic oxide.

Like the liquid composition of the first embodiment, the liquid composition of the second embodiment further includes the dispersion medium.

From the viewpoint of uniform film formation, the concentration of the insulating material in the liquid composition of the second embodiment is preferably 10% by mass or more, more preferably 20% by mass or more. Note that the concentration of the insulating material in the liquid composition is preferably 60% by mass or less from the viewpoint of the viscosity of the liquid composition, and more preferably 55% by mass or less from the viewpoint of inkjet ejection.

The liquid composition of the second embodiment may further include a surfactant, a pH adjuster, a rust inhibitor, a preservative, an antifungal agent, an antioxidant, a reduction inhibitor, an evaporation accelerator, a chelating agent, and the like for the purpose of viscosity adjustment, particle diameter adjustment, surface tension adjustment, non-aqueous solvent evaporation control, additive solubility improvement, material dispersibility improvement, sterilization, and the like.

Note that the production method and use method of the liquid composition according to the second embodiment are the same as the production method and use method of the liquid composition according to the first embodiment.

In the method for producing the electrode according to the second embodiment, the electrode can be produced using the electrode production apparatus illustrated in FIG. 10 in the same manner as the method for producing the electrode according to the first embodiment.

As described above, in the second embodiment, the electrode mixture layer includes the positive electrode active material, and the insulating layer disposed on the electrode mixture layer includes at least one resin having the repeating structural unit represented by the general formula (3) or (4) described above.

In this manner, in the second embodiment, a protective layer including the dispersant and the insulating material is formed on the positive electrode, making it possible to provide the electrode with which the electrochemical element that prevents leakage current due to oxidative deterioration of the separator while maintaining the high safety due to heat resistance and the high input/output characteristics can be obtained.

Further, as described above, "A" in the general formula (4) includes the ethyloxy group terminally protected by a hydroxyl group or an alkyl group having 1 to 4 carbon atoms, making it possible to provide the electrode with which the electrochemical element that further prevents leakage current due to oxidative deterioration of the separator while maintaining the high safety and input/output characteristics can be obtained.

Further, as described above, including the polymer compound having the hydroxyl groups or the amino groups at least at two or more terminals makes it possible to provide the electrode with which the electrochemical element that prevents leakage current due to oxidative deterioration of the separator while maintaining the higher safety and input/output characteristics can be obtained.

Further, as described above, the polymer compound is the poloxamer, making it possible to provide the electrode that improves the input/output characteristics and the safety of the electrochemical element.

Further, as described above, the mass ratio of the resin having the repeating structural unit represented by the general formula (3) or (4) described above relative to the insulating material is 0.3% or more and 20% or less, making it possible to provide the electrode capable of further preventing leakage current and improving heat resistance while maintaining the high input/output characteristics of the electrochemical element.

Further, as described above, the liquid composition according to the second embodiment includes the insulating material and at least one of the resin having the repeating structural unit represented by the general formula (3) described above or the resin represented by the general formula (4) described above. This allows the liquid composition to be used in the production of the electrode in which the insulating layer including at least one resin having the repeating structural unit represented by the general formula (3) or (4) described above is formed on the electrode mixture layer.

Thus, using the liquid composition according to the second embodiment makes it possible to produce the electrode with which the electrochemical element that prevents leakage current due to oxidative deterioration of the separator while maintaining the input/output characteristics and safety of the electrochemical element can be obtained.

EXAMPLES

Examples of the present disclosure will be described below. However, the following examples are not intended to limit the present disclosure. Note that "parts" and "%" are based on mass unless otherwise specified.

<Median Diameter D50 of Liquid Composition>

After diluting a liquid composition until a value of D50 stabilizes, the median diameter D50 of the liquid composition was measured using a fiber-optics particle analyzer (manufactured by Otsuka Electronics Co., Ltd., FPAR-1000). Evaluation was performed according to the following criteria. Note that A was evaluated as excellent. B as good, and C as poor.

A: median diameter D50 of liquid composition of less than 500 nm

B: median diameter D50 of liquid composition of 500 nm or more and less than 1000 nm C: median diameter D50 of liquid composition of 1000 nm or more Note that the median diameter D50 of the insulating material included in the liquid composition is preferably less than 1000 nm from the viewpoint of inkjet ejection, and more preferably less than 500 nm from the viewpoint of ejection stability.

<Viscosity Measurement of Liquid Composition>

After stabilizing the temperature of the liquid composition at 25° C., an E-type viscometer (manufactured by Tokisangyo, TVE-25L) was used to measure the viscosity of the liquid composition at the time when the rotor speed of the viscometer was 100 rpm.

Evaluation was performed according to the following criteria. Note that A was evaluated as excellent, B as good, and C as poor.

A: viscosity of liquid composition of less than 12 mPa-sec

B: viscosity of liquid composition of 12 mPa-sec or more and less than 20 mPa-sec C: viscosity of liquid composition of 20 mPa-sec or more Note that the viscosity of the liquid composition is preferably less than 12 mPa-sec from the viewpoint of inkjet ejection, and more preferably less than 20 mPa-sec from the viewpoint of applying thinner coating on the base material.

<Evaluation of Inkjet Ejection Property>

Whether the liquid composition thus produced could be ejected by inkjet was evaluated based on the median diameter D50 and viscosity of the liquid composition. Evaluation was performed according to the following criteria. Note that A was evaluated as good and B was evaluated as poor.

A: both median diameter D50 and viscosity of liquid composition are A or B

B: at least one of median diameter D50 or viscosity of liquid composition is C

<Preparation of Liquid Composition>

After putting a pre-dispersion liquid, which is a mixture of an insulating material, a solvent, and a resin in a predetermined ratio, and zirconium beads of 5 mmΦ in a ball mill pot made of glass, the sealed pot was placed on a mill rotating table and the mixture was dispersed to obtain a liquid composition. Note that the rotation speed of the pot during dispersion was 35 rpm, and the dispersion was judged to be complete when the viscosity change reached a steady state. Examples 1-1 to 1-33 and Comparative examples 1-1 to 1-5 shown in Table 1 were produced using the following Liquid composition production examples 1-1 to 1-38.

Liquid Composition Production Example 1-1

A pre-dispersion liquid prepared by mixing 40.0% of alumina A as a solid content, 59.6% of ethyl lactate as a dispersion medium, no content of a resin 1 described below, and 0.4% of a polymer compound (manufactured by DKS Co. Ltd., EPAN (registered trademark) 740) as a resin 2 was dispersed by the preparation method described above. Note that alumina A is pulverized alumina having an average particle diameter of 0.5 μm and a specific surface area of 7.8 $g/m^2$. Further, EPAN 740 is a resin having the repeating structural unit represented by the general formula (5) described above (hereinafter referred to as a resin of the general formula (5)). Note that "EPAN" is a registered trademark.

Liquid Composition Production Example 1-2

The pre-dispersion liquid prepared by mixing 40.0% of alumina A as the solid content, 58.0% of ethyl lactate as the dispersion medium, 2.0% of SC-0708A (manufactured by NOF Corp.) as the resin 1, and no content of the resin 2 was dispersed by the preparation method described above. Note that SC-0708A is a resin having the repeating structural unit represented by the general formula (3) described above (hereinafter referred to as a resin of the general formula (3)).

[Liquid Composition Production Example 1-3]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-4]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of EPAN 450 (manufactured by DKS Co. Ltd.) as the resin 2 was dispersed by the preparation method described above.

[Liquid Composition Production Example 1-5]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of JEFFAMINE ED-2003 (manufactured by Huntsman Corp.) as the resin 2 was dispersed by the preparation method described above. Note that JEFFAMINE ED-2003 is a resin of the general formula (5) described above.

[Liquid Composition Production Example 1-6]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of JEFFAMINE D-2000 (manufactured by Huntsman Corp.) as the resin 2 was dispersed by the preparation method described above.

Note that JEFFAMINE D-2000 is a resin of the general formula (5) described above.

[Liquid Composition Production Example 1-7]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of DBE-C25 (manufactured by Gelest Inc., "DBE" is a registered trademark) as the resin 2 was dispersed by the preparation method described above. Note that DBE-C25 is a resin of the general formula (5) described above.

[Liquid Composition Production Example 1-8]

The pre-dispersion liquid prepared by mixing 40.0% of alumina A as the solid content, 57.4% of ethyl lactate as the dispersion medium, 2.0% of SC-0708A (manufactured by NOF Corp.) as the resin 1, and 0.4% of DULANOL T5650E (manufactured by Asahi Kasei Corp.) as the resin 2 was dispersed by the preparation method described above. The pre-dispersion liquid to which 0.2% of (N,N-diisopropylethylamine (DIPPA) was added as an additive was dispersed by the preparation method described above. Note that DULANOL T5650E is a resin of the general formula (5) described above.

[Liquid Composition Production Example 1-9]

The pre-dispersion liquid prepared by mixing 40.0% of alumina A as the solid content, 57.4% of ethyl lactate as the dispersion medium, 2.0% of SC-0708A (manufactured by NOF Corp.) as the resin 1, 0.4% of ETERNACOLL-PH200J (manufactured by UBE Corp, "ETERNACOLL" is a registered trademark) as the resin 2, and 0.2% of DIPPA as the additive was dispersed by the preparation method described above. Note that ETERNACOLL-PH200J is a resin of the general formula (5) described above.

[Liquid Composition Production Example 1-10]

The pre-dispersion liquid prepared by mixing 40.0% of alumina A as the solid content, 57.4% of ethyl lactate as the dispersion medium, 2.0% of SC-0708A (manufactured by NOF Corp.) as the resin 1, 0.4% of NISSO-PB-G1000 (manufactured by Nippon Soda Co., Ltd., "NISSO" is a registered trademark) as the resin 2, and 0.2% of DIPPA as the additive was dispersed by the preparation method described above. Note that NISSO-PB-G1000 is a resin of the general formula (5) described above.

[Liquid Composition Production Example 1-11]

The pre-dispersion liquid prepared by mixing 40.0% of alumina A as the solid content, 57.4% of ethyl lactate as the dispersion medium, 2.0% of SC-0708A (manufactured by NOF Corp.) as the resin 1, 0.4% of NISSO-PB-G1000 (manufactured by Nippon Soda Co., Ltd.) as the resin 2, and 0.2% of DIPPA as the additive was dispersed by the preparation method described above. Note that NISSO-PB-G1000 is a resin of the general formula (5) described above.

[Liquid Composition Production Example 1-12]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of polyethylene glycol (molecular weight 200) as the resin 2 was dispersed by the preparation method described above. Note that polyethylene glycol is a resin of the general formula (5) described above.

[Liquid Composition Production Example 1-13]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of UNILUBE 5TP-300KP (manufactured by NOF Corp.) as the resin 2 was dispersed by the preparation method described above. Note that UNILUBE 5TP-300KP is a resin of the general formula (5) described above.

[Liquid Composition Production Example 1-14]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of NYMEEN L207 (manufactured by NOF Corp., "NYMEEN" is a registered trademark) as the resin 2 was dispersed by the preparation method described above. Note that NYMEEN L207 is a resin of the general formula (5) described above.

[Liquid Composition Production Example 1-15]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of NYMEEN DT208 (manufactured by NOF Corp.) as the resin 2 was dispersed by the preparation method described above. Note that NYMEEN DT208 is a resin of the general formula (5) described above.

[Liquid Composition Production Example 1-16]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of TR-701 (manufactured by ADEKA Corp.) as the resin 2 was dispersed by the preparation method described above. Note that TR-701 is a resin of the general formula (5) described above.

[Liquid Composition Production Example 1-17]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of TRD-202A (manufactured by JSR Corp., "TRD" is a registered trademark) as the resin 2 was dispersed by the preparation method described above. Note that TRD-202A is a fluorine-based acrylic resin and is a polymer binder resin that does not belong to the resin of the general formula (5) described above.

[Liquid Composition Production Example 1-18]

The pre-dispersion liquid prepared by mixing 40.0% of alumina A as the solid content, 57.6% of ethyl lactate as the dispersion medium, 2.0% of SC-0708A (manufactured by NOF Corp.) as the resin 1, and 0.4% of GE191-104 (manufactured by Showa Denko K.K.) as the resin 2 was dispersed by the preparation method described above. Note that GE191-104 is poly-N-vinylacetamide and is a polymer binder resin that does not belong to the resin of the general formula (5) described above.

[Liquid Composition Production Example 1-19]

The pre-dispersion liquid prepared by mixing 40.0% of alumina A as the solid content, 57.9% of ethyl lactate as the dispersion medium, 2.0% of SC-0708A (manufactured by NOF Corp.) as the resin 1, and 0.1% of the polymer compound (manufactured by DKS Co. Ltd., EPAN 740) as the resin 2 was dispersed by the preparation method described above.

[Liquid Composition Production Example 1-20]

The pre-dispersion liquid prepared by mixing 40.0% of alumina A as the solid content, 57.8% of ethyl lactate as the dispersion medium, 2.0% of SC-0708A (manufactured by NOF Corp.) as the resin 1, and 0.2% of the polymer compound (manufactured by DKS Co. Ltd., EPAN 740) as the resin 2 was dispersed by the preparation method described above.

[Liquid Composition Production Example 1-21]

The pre-dispersion liquid prepared by mixing 40.0% of alumina A as the solid content, 56.8% of ethyl lactate as the dispersion medium, 2.0% of SC-0708A (manufactured by NOF Corp.) as the resin 1, and 1.2% of the polymer compound (manufactured by DKS Co. Ltd., EPAN 740) as the resin 2 was dispersed by the preparation method described above.

[Liquid Composition Production Example 1-22]

The pre-dispersion liquid prepared by mixing 40.0% of alumina A as the solid content, 56.4% of ethyl lactate as the dispersion medium, 2.0% of SC-0708A (manufactured by NOF Corp.) as the resin 1, and 1.6% of the polymer compound (manufactured by DKS Co. Ltd., EPAN 740) as the resin 2 was dispersed by the preparation method described above.

[Liquid Composition Production Example 1-23]

The pre-dispersion liquid prepared by mixing 40.0% of alumina A as the solid content, 59.2% of ethyl lactate as the dispersion medium, 0.4% of SC-0708A (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-24]

The pre-dispersion liquid prepared by mixing 40.0% of alumina A as the solid content, 58.8% of ethyl lactate as the dispersion medium, 0.8% of SC-0708A (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-25]

The pre-dispersion liquid prepared by mixing 40.0% of alumina A as the solid content, 56.8% of ethyl lactate as the dispersion medium, 2.8% of SC-0708A (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-26]

The pre-dispersion liquid prepared by mixing 40.0% of alumina A as the solid content, 55.6% of ethyl lactate as the dispersion medium, 4.0% of SC-0708A (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-27]

The pre-dispersion liquid prepared by mixing 40.0% of alumina A as the solid content, 55.2% of ethyl lactate as the dispersion medium, 4.4% of SC-0708A (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-28]

The pre-dispersion liquid prepared by mixing 40.0% of alumina A as the solid content, 58.0% of ethyl lactate as the dispersion medium, 2.0% of AKM-0531 (manufactured by NOF Corp.) as the resin 1, and no content of the resin 2 was dispersed by the preparation method described above. Note that AKM-0531 is a resin of the general formula (3) described above.

[Liquid Composition Production Example 1-29]

The pre-dispersion liquid prepared by mixing 40.0% of alumina A as the solid content, 58.0% of ethyl lactate as the dispersion medium, 2.0% of AKM-0531 (manufactured by NOF Corp.) as the resin 1, and 0.4% of the polymer compound (manufactured by DKS Co. Ltd., EPAN 740) as the resin 2 was dispersed by the preparation method described above.

[Liquid Composition Production Example 1-30]

The pre-dispersion liquid prepared by mixing 40.0% of alumina A as the solid content, 57.6% of ethyl lactate as the dispersion medium, 2.0% of AKM-0531 (manufactured by NOF Corp.) as the resin 1, and 0.4% of JEFFAMINE ED-2003 (manufactured by Huntsman Corp.) as the resin 2 was dispersed by the preparation method described above.

[Liquid Composition Production Example 1-31]

The pre-dispersion liquid prepared by mixing 40.0% of alumina A as the solid content, 57.6% of ethyl lactate as the dispersion medium, 2.0% of AKM-0531 (manufactured by NOF Corp.) as the resin 1, and 0.4% of TRD-202A (manufactured by JSR Corp.) as the resin 2 was dispersed by the preparation method described above.

[Liquid Composition Production Example 1-32]

The pre-dispersion liquid prepared by mixing 40.0% of alumina A as the solid content, 57.6% of ethyl lactate as the dispersion medium, 2.0% of DIACARNA 30M (manufactured by Mitsubishi Chemical Corp., "DIACARNA" is a registered trademark) as the resin 1, and 0.4% of the polymer compound (manufactured by DKS Co. Ltd., EPAN 740) as the resin 2 was dispersed by the preparation method described above. Note that DIACARNA 30M is a resin of the general formula (3) described above.

[Liquid Composition Production Example 1-33]

The pre-dispersion liquid prepared by mixing 40.0% of alumina A as the solid content, 57.6% of ethyl lactate as the dispersion medium, 2.0% of a maleic anhydride copolymer as the resin 1, and 0.4% of the polymer compound (manufactured by DKS Co. Ltd., EPAN 740) as the resin 2 was dispersed by the preparation method described above. Note that the maleic anhydride copolymer is a resin produced in Resin synthesis example 1 described below and a resin of the general formula (3) described above.

[Liquid Composition Production Example 1-34]

The pre-dispersion liquid prepared by mixing 40.0% of alumina A as the solid content, 57.6% of water as the dispersion medium, 2.0% of ISOBAM-10 (manufactured by Kuraray Co., Ltd., "ISOBAM" is a registered trademark) as the resin 1, and 0.4% of the polymer compound (manufactured by DKS Co. Ltd., EPAN 740) as the resin 2 was dispersed by the preparation method described above. Note that ISOBAM-10 a resin of the general formula (3) described above.

[Liquid Composition Production Example 1-35]

The pre-dispersion liquid prepared by mixing 40.00% of alumina A as the solid content, 57.6% of water as the dispersion medium, 2.0% of ARON T-50 (manufactured by Toagosei Co., Ltd., "ARON" is a registered trademark) as the resin 1, and 0.4% of the polymer compound (manufactured by DKS Co. Ltd., EPAN 740) as the resin 2 was dispersed by the preparation method described above. Note that sodium polyacrylate is a resin that does not belong to the general formula (3) described above.

[Liquid Composition Production Example 1-36]

The pre-dispersion liquid prepared by mixing 40.0% of alumina B as the solid content, 57.6% of ethyl lactate as the dispersion medium, 2.0% of SC-0708A (manufactured by NOF Corp.) as the resin 1, and 0.4% of the polymer compound (manufactured by DKS Co. Ltd., EPAN 740) as the resin 2 was dispersed by the preparation method described above. Note that alumina B is synthetic alumina having the average particle diameter of 0.70 μm, the specific surface area of 4.5 $g/m^2$, and a tetrapod shape, which is one of irregular shapes.

[Liquid Composition Production Example 1-37]

The pre-dispersion liquid prepared by mixing 40.0% of titanium oxide as the solid content, 57.6% of ethyl lactate as the dispersion medium, 2.0% of SC-0708A (manufactured by NOF Corp.) as the resin 1, and 0.4% of the polymer compound (manufactured by DKS Co. Ltd., EPAN 740) as the resin 2 was dispersed by the preparation method described above. Note that the titanium oxide is synthetically produced titanium oxide having the average particle diameter of 0.27 μm and the specific surface area of 6.8 $g/m^2$.

[Liquid Composition Production Example 1-38]

The pre-dispersion liquid prepared by mixing 40.00% of melamine as the solid content, 57.6% of ethyl lactate as the dispersion medium, 2.0% of SC-0708A (manufactured by NOF Corp.) as the resin 1, and 0.4% of the polymer compound (manufactured by DKS Co. Ltd., EPAN 740) as the resin 2 was dispersed by the preparation method described above. Note that melamine is a synthetically produced spherical material having the average particle diameter of 0.27 μm.

(Resin Synthesis Example 1)

A desired resin was obtained according to "Advanced Journal of Chemistry-Section A, 2019, 2(3), pp. 256-265".

Specifically, after dissolving 4.37 parts of methoxytriethylene glycol acrylate (manufactured by Tokyo Chemical Industry Co., Ltd.) and 1.72 parts of maleic anhydride (manufactured by Tokyo Chemical Industry Co., Ltd.) in 10 parts of ethyl acetate, the solution was subjected to nitrogen flow for 2 hours. Next, 0.05 parts of azobisisobutyronitrile (manufactured by Tokyo Chemical Industry Co., Ltd.) was added, and the mixture was stirred at 70° C. for 24 hours under a nitrogen stream to perform a polymerization reaction. After polymerization, the resin of interest (Mw=7,800) was obtained by removing the solvent by distillation under reduced pressure.

2 parts of a polymer (styrene-butadiene rubber), and 100 parts of water as a solvent were added to produce an electrode paint.

The electrode paint was applied onto the negative electrode current collector made of copper and then dried to obtain an electrode having the negative electrode mixture layers formed on both sides with a coating amount per unit area (area density) of 9 mg/cm$^2$ on one side. In this case, the electrode had a thickness of 216 μm and a volume density of 0.91 g/cm$^3$. Next, the electrode was pressed with a roll press machine so that the deposition density of the electrode was 1.6 g/cm$^3$, thereby obtaining a negative electrode to be used.

TABLE 1

| | Liquid composition | Median diameter (D50) | Viscosity | Ejection property |
|---|---|---|---|---|
| Example 1-1 | Production example 1-2 | A | A | A |
| Example 1-2 | Production example 1-3 | A | A | A |
| Example 1-3 | Production example 1-4 | A | A | A |
| Example 1-4 | Production example 1-5 | A | A | A |
| Example 1-5 | Production example 1-6 | A | A | A |
| Example 1-6 | Production example 1-7 | A | A | A |
| Example 1-7 | Production example 1-8 | A | B | A |
| Example 1-8 | Production example 1-9 | A | A | A |
| Example 1-9 | Production example 1-10 | A | B | A |
| Example 1-10 | Production example 1-11 | A | B | A |
| Example 1-11 | Production example 1-12 | A | A | A |
| Example 1-12 | Production example 1-13 | A | A | A |
| Example 1-13 | Production example 1-14 | A | A | Å |
| Example 1-14 | Production example 1-15 | A | A | A |
| Example 1-15 | Production example 1-16 | A | A | A |
| Example 1-16 | Production example 1-19 | A | A | A |
| Example 1-17 | Production example 1-20 | A | A | A |
| Example 1-18 | Production example 1-21 | A | A | A |
| Example 1-19 | Production example 1-22 | A | A | A |
| Example 1-20 | Production example 1-23 | B | A | A |
| Example 1-21 | Production example 1-24 | A | A | A |
| Example 1-22 | Production example 1-25 | A | A | A |
| Example 1-23 | Production example 1-26 | A | B | A |
| Example 1-24 | Production example 1-28 | A | A | A |
| Example 1-25 | Production example 1-29 | A | A | A |
| Example 1-26 | Production example 1-30 | A | A | A |
| Example 1-27 | Production example 1-32 | A | A | A |
| Example 1-28 | Production example 1-33 | B | B | A |
| Example 1-29 | Production example 1-34 | B | B | A |
| Example 1-30 | Production example 1-35 | B | B | A |
| Example 1-31 | Production example 1-36 | B | B | A |
| Example 1-32 | Production example 1-37 | A | A | A |
| Example 1-33 | Production example 1-38 | B | B | A |
| Comparative example 1-1 | Production example 1-1 | C | C | B |
| Comparative example 1-2 | Production example 1-17 | C | C | B |
| Comparative example 1-3 | Production example 1-18 | B | C | B |
| Comparative example 1-4 | Production example 1-27 | A | C | B |
| Comparative example 1-5 | Production example 1-31 | C | C | B |

From Table 1, Examples 1-1 to 1-33 were all good in the median diameter, the viscosity, and the ejection property.

On the other hand, in the Liquid composition production example 1-1, in which the resin 1 was not added, aggregation of the insulating material was confirmed, resulting in high viscosity (Comparative Example 1-1). Further, in the Liquid composition production example 1-27, in which an excessive amount of the resin 1 is added, although the insulating material is dispersed, the viscosity is high due to the large amount of the resin (Comparative Example 1-3). Further, in the Liquid composition production examples 1-17, 1-18, and 1-31, in which the added amount of the resin 1 was appropriate and the soluble polymer binder was used instead of the resin 2, aggregation of the insulating material and significant thickening were confirmed (Comparative Examples 1-2, 1-3, and 1-5).

<Production of Negative Electrode>

For forming the negative electrode mixture layer, 97 parts of graphite, 1 part of a thickener (carboxymethylcellulose), <Production of Positive Electrode>

Having prepared 92 parts of lithium nickel oxide (NCA) as a positive electrode active material, 3 parts of acetylene black as a conductive material, and 5 parts of polyvinylidene fluoride (PVDF) as a binder, these materials were dispersed in N-methylpyrrolidone (NMP) to produce a slurry.

This slurry was applied onto a positive electrode current collector made of aluminum and then dried to obtain a positive electrode having the positive electrode mixture layers formed on both sides with a coating amount per unit area (area density) of 15.0 mg/cm$^2$.

Next, the positive electrode was subjected to compression molding using a roll press machine so that the volume density of the electrode was 2.8 g/cm$^3$, thereby forming a positive electrode mixture layer.

<Formation of Insulating Layer>

The liquid compositions described in the Liquid composition production examples 1-1 to 1-38 were applied onto base materials to be coated (positive electrodes, negative electrodes, and separators) to produce Examples 2-1 to 2-36 and Comparative examples 2-1 to 2-6 shown in Table 2. Note that the liquid compositions were applied using an inkjet or bar coater, and then the dispersion media were volatilized on a hot plate heated to 120° C. to form insulating layers.

Further, the insulating layer of the present embodiment becomes a stronger film by reaction of the resin (resin 1) of the general formula (3) described above and the resin (resin 2) of the general formula (5) described above. Thus, after volatilizing the dispersion medium, additional heat drying was performed. Note that the higher the drying temperature in this process, the shorter the time required for the reaction, and the time can be further shortened under a vacuum environment.

From the viewpoint of the production process of the battery, the positive electrode or the negative electrode is subjected to the heat drying in a vacuum preferably at 100° C. or higher, more preferably at 120° C. or higher. Considering the heat resistance of the base material of the separator, the heat drying is desirably performed in a vacuum at 60° C. or higher.

<IR Analysis of Insulating Layer>

Infrared spectroscopy (IR) was used to confirm whether the resin 1 and the resin 2 included in the insulating layer were reacted with each other by vacuum heating and formed a bond having the repeating structural unit represented by the general formula (1) described above or a bond having the repeating structural unit represented by the general formula (2) described above.

It was confirmed that peaks at 1782 $cm^{-1}$ and 1858 $cm^{-1}$ presumed to be derived from the bond having the repeating structural unit represented by the general formula (3) described above in the resin of the general formula (5) described above were reduced as compared with the peaks before vacuum heating. Further, an increase in a peak at 1734 $cm^1$ presumed to be derived from C═O stretching vibration such as —COOR or —COOH was confirmed, making it possible to confirm that the reaction had occurred.

<Film Thickness Measurement of Insulating Layer>

The film thickness of the insulating layer formed on the base material to be coated was measured using a micrometer (manufactured by Mitutoyo Corp., MDH-25 MB).

<Peel Strength Evaluation of Insulating Layer>

Peel strength evaluation was performed as binding evaluation of the insulating layer formed on the base material to be coated. A light load-type adhesive/film peeling analyzer (manufactured by Kyowa Interface Science, Co., Ltd., VPA-3S) as an evaluation device and a tape having a width of 18 mm (manufactured by Nittosha Co., Ltd., cellophane tape) were used. After sticking the tape on the insulating layer, the average value of the load applied to the load cell when a peeling operation was performed at a peeling angle of 90 degrees and a speed of 30 mm/min was read to evaluate the binding. Evaluation was performed according to the following criteria. Note that A was evaluated as excellent, B as good, and C as poor.

A: peel strength of 20 N/m or more

B: peel strength of 10 N/m or more and less than 20 N/m

C: peel strength of less than 10N/m

Note that the peel strength is preferably 10 N/m or more so that the insulating material does not peel off inside the secondary battery, and the peel strength is more preferably 20 N/m or more so that the insulating material does not peel off even in a load test such as a temperature rise test of the secondary battery.

TABLE 2

| | Liquid composition | Application method | Base material | Drying condition | Film thickness (μm) | Peel strength |
|---|---|---|---|---|---|---|
| Example 2-1 | Production example 1-3 | Inkjet | Negative electrode | 80° C. | 5 | B |
| Example 2-2 | Production example 1-3 | Inkjet | Negative electrode | 120° C. | 5 | A |
| Example 2-3 | Production example 1-3 | Inkjet | Negative electrode | 150° C. | 5 | A |
| Example 2-4 | Production example 1-3 | Inkjet | Positive electrode | 120° C. | 5 | A |
| Example 2-5 | Production example 1-3 | Inkjet | Separator | 80° C. | 6 | B |
| Example 2-6 | Production example 1-4 | Inkjet | Negative electrode | 150° C. | 5 | A |
| Example 2-7 | Production example 1-5 | Inkjet | Negative electrode | 150° C. | 5 | A |
| Example 2-8 | Production example 1-6 | Inkjet | Negative electrode | 150° C. | 5 | A |
| Example 2-9 | Production example 1-7 | Inkjet | Negative electrode | 150° C. | 5 | A |
| Example 2-10 | Production example 1-8 | Inkjet | Negative electrode | 150° C. | 5 | A |
| Example 2-11 | Production example 1-9 | Inkjet | Negative electrode | 150° C. | 5 | A |
| Example 2-12 | Production example 1-10 | Inkjet | Negative electrode | 150° C. | 5 | A |
| Example 2-13 | Production example 1-11 | Bar coater | Negative electrode | 150° C. | 13 | A |
| Example 2-14 | Production example 1-12 | Bar coater | Negative electrode | 150° C. | 15 | A |
| Example 2-15 | Production example 1-13 | Inkjet | Negative electrode | 150° C. | 5 | A |
| Example 2-16 | Production example 1-14 | Inkjet | Negative electrode | 150° C. | 5 | A |
| Example 2-17 | Production example 1-15 | Inkjet | Negative electrode | 150° C. | 5 | A |
| Example 2-18 | Production example 1-16 | Inkjet | Negative electrode | 150° C. | 5 | A |
| Example 2-19 | Production example 1-17 | Bar coater | Negative electrode | 150° C. | 13 | A |
| Example 2-20 | Production example 1-18 | Bar coater | Negative electrode | 150° C. | 15 | A |
| Example 2-21 | Production example 1-20 | Inkjet | Negative electrode | 150° C. | 5 | B |
| Example 2-22 | Production example 1-21. | Inkjet | Negative electoode | 150° C. | 5 | A |
| Example 2-23 | Production example 1-22 | Inkjet | Negative electrode | 150° C. | 5 | A |
| Example 2-24 | Production example 1-24 | Inkjet | Negative electrode | 150° C. | 5 | B |
| Example 2-25 | Production example 1-25 | Inkjet | Negative electrode | 150° C. | 5 | A |
| Example 2-26 | Production example 1-26 | Inkjet | Negative electrodie | 150° C. | 5 | A |
| Example 2-27 | Production example 1-27 | Bar coater | Negative electrode | 150° C. | 12 | A |
| Example 2-28 | Production example 1-29 | Inkjet | Negative electrode | 150° C. | 5 | A |
| Example 2-29 | Production example 1-30 | Inkjet | Negative electrode | 150° C. | 5 | A |
| Example 2-30 | Production example 1-31 | Bar coater | Negative electrode | 150° C. | 11 | A |
| Example 2-31 | Production example 1-32 | Inkjet | Negative diecrode | 150° C. | 5 | A |
| Example 2-32 | Production example 1-33 | Inkjet | Negative electrode | 150° C. | 5 | B |

TABLE 2-continued

| | Liquid composition | Application method | Base material | Drying condition | Film thickness (μm) | Peel strength |
|---|---|---|---|---|---|---|
| Example 2-33 | Production example 1-34 | Inkjet | Negative electrode | 150° C. | 5 | A |
| Example 2-34 | Production example 1-36 | Inkjet | Negative electrode | 150° C. | 5 | A |
| Example 2-35 | Production example 1-37 | Inkjet | Negative electrode | 150° C. | 5 | A |
| Example 2-36 | Production example 1-38 | Inkjet | Negative electrode | 150° C. | 5 | B |
| Comparative example 2-1 | Production example 1-1 | Bar coates | Negative electrode | 150° C. | 12 | C |
| Comparative example 2-2 | Production example 1-2 | Inkjet | Negative electrode | 150° C. | 5 | C |
| Comparative example 2-3 | Production example 1-19 | Inkjet | Negative electrode | 150° C. | 5 | C |
| Comparative example 2-4 | Production example 1-23 | Inkjet | Negative electrode | 150° C. | 5 | C |
| Comparative example 2-5 | Production example 1-28 | Inkjet | Negative electrode | 150° C. | 5 | C |
| Comparative example 2-6 | Production example 1-35 | Inkjet | Negative electrode | 150° C. | 5 | C |

From Table 2, all of Examples 2-1 to 2-36 had good peel strength. Note that the liquid compositions of the Production examples 1-1, 1-17, 1-18, 1-27, and 1-31 were applied with a bar coater because these liquid compositions could not be ejected by the ink-jet. Using these liquid compositions having high viscosity resulted in forming thick films.

In contrast, no improvement in the binding was confirmed after vacuum heating in the insulating layers produced using the liquid compositions to which the resin 1 or the resin 2 was not added (Production examples 1-1, 1-2, and 1-28) or the liquid composition in which the resin 1 did not include the resin of the general formula (3) described above (Production example 1-35) (Comparative examples 2-1, 2-2, and 2-5).

Further, it was confirmed that, even with the liquid compositions, in which the resin 1 included the resin of the general formula (3) described above and the resin 2 included the resin of the general formula (5) described above, if either of the added amount was small (Production examples 1-19 and 1-23), sufficient binding was not developed (Comparative examples 2-3 and 2-4).

<Battery Production>

In a case where the insulating layer was formed on either the positive electrode or the negative electrode, the negative electrode or the positive electrode in which the insulating layer was formed was alternately stacked with the electrode with a different polarity via the separator to obtain an electrode laminate.

After mounting the electrode laminate in a laminate and injecting the electrolyte (EC:DMC:EC=1%: 1%: 1%, 1.5 mol/L $LiPF_6$, vinylene carbonate (VC) 1%), the inside of the laminate was vacuum-sealed to produce lithium-ion secondary batteries shown in Table 3

(Cell Production Examples 1 to 3).

In a case where the separator in which the insulating layer was formed was used, the separator in which the insulating layer was formed was sandwiched between the negative electrode and the positive electrode, and the negative electrode, the separator, and the positive electrode were alternately stacked to obtain an electrode laminate. Note that two patterns of the electrode laminates, the one with the surface on which the insulating layer was formed facing the positive electrode and the one with the surface facing the negative electrode, were produced.

After mounting the electrode laminate in the laminate and injecting the electrolyte (EC:DMC:EC=1%:1%:1%, 1.5 mol/L $LiPF_6$, vinylene carbonate (VC) 1%), the inside of the laminates was vacuum-sealed to produce lithium-ion secondary batteries shown in Table 3

(Cell Production Examples 4 and 5).

<Battery Evaluation>

An output characteristics test, a float test, and a temperature rise test were performed to evaluate the battery characteristics, reliability, and safety, respectively, of the lithium-ion batteries thus produced.

<Initial Charge and Capacity Check>

The positive electrode lead wire and the negative electrode lead wire of the battery thus produced were connected to a charge/discharge tester and subjected to constant-current and constant-voltage charge at the maximum voltage of 4.2 V and a current rate of 0.2 C for 5 hours. After charging was completed, the battery was placed in a constant temperature bath at 40° C. for 5 days. Then, constant current discharge was performed to 2.5V at the current rate of 0.2 C. After that, the constant-current and constant-voltage charge was performed at the maximum voltage of 4.2 V and the current rate of 0.2 C for 5 hours, followed by a 10-minute rest period, and the constant-current discharge was performed to 2.5 V at the current rate of 0.2 C. The discharge capacity in this operation was defined as the initial capacity.

<Output Characteristics>

The positive electrode lead wire and the negative electrode lead wire of the battery whose initial capacity was measured as described above were connected to the charge/discharge tester to perform charging at the maximum voltage of 4.2 V and the current rate of 0.2 C for 5 hours. After a 10-minute rest period, the battery was subjected to the constant-current discharge at the constant current rate of 0.2 C for 2.5 hours, so that the lithium-ion battery was brought into a state of 50% depth of charge. Next, pulse discharge was performed at the current rate of 1 C to 10 C for 10 seconds, and the electric power leading to the 2.5 V cutoff voltage was calculated from the correlation line between the voltage and current values after the pulses, and the output density was calculated by dividing by the cell weight. The characteristics of each battery were evaluated by comparing a ratio of the output density relative to a reference battery having no coating on the electrode. The output characteristics were evaluated according to the following evaluation criteria relative to the lithium-ion battery in which the insulating layer was not formed. Note that A was evaluated as good and B was evaluated as poor.

A: 95% or more relative to lithium-ion battery having no insulating layer formed B: less than 95% relative to lithium-ion battery having no insulating layer formed <Float Test>

A charge/discharge test was performed to evaluate constant voltage float characteristics of the lithium-ion secondary battery. Specifically, a fully charged lithium-ion secondary battery was placed in a constant temperature bath set at 60° C. and charged at a constant voltage of 4.2V for 10 days.

The integrated charging capacity [mAh] in this constant voltage charge was calculated. The float characteristics were evaluated according to the following criteria. Note that A was evaluated as good and B was evaluated as poor.

A: integrated charge capacity of 20 mAh or less

B: integrated charge capacity of greater than 20 mAh

<Temperature Rise Test>

A temperature rise test was performed to evaluate high temperature resistance of the lithium-ion secondary battery. Specifically, a 4.2V fully charged lithium-ion secondary battery was placed in a constant temperature bath, left at a temperature of 30° C. for 30 minutes, and then heated to 140° C. at a temperature rise rate of 5 C per minute. After reaching 140° C. the temperature was held for 30 minutes and decreased. The voltage of the lithium-ion secondary battery during this test was measured, and a cell with a cell voltage of less than 1 V was judged to be short-circuited. The high temperature resistance was evaluated according to the following evaluation criteria. Note that A was evaluated as excellent, B as good, and C as poor.

A: percentage of short-circuited cells of less than 10%

B: percentage of short-circuited cells of 10% or more and less than 50%

C: percentage of short-circuited cells of 50% or more

Table 3 shows the results of the output characteristics, the float test, and the temperature rise test for Cell production examples 1 to 5.

TABLE 3

| Cell production example | Positive electrode | Negative electrode | Separator | Output characteristics | Float test | Temperature rise test |
|---|---|---|---|---|---|---|
| Cell production example 1 | Uncoated | Uncoated | Not coated with insulating film | A | B | C |
| Cell production example 2 | Uncoated | Example 2-3 | Not coated with insulating film | A | B | A |
| Cell production example 3 | Example 2-4 | Uncoated | Not coated with insulating film | A | A | A |
| Cell production example 4 | Uncoated | Uncoated | Example 2-5 (Insulating film facing negative electrode) | A | B | B |
| Cell production example 5 | Uncoated | Uncoated | Example 2-5 (Insulating film facing positive electrode) | A | A | B |

The output characteristics of the lithium-ion batteries in which the insulating layers were formed were all good (Cell production example 1 to 5).

Further, in the float test, the lithium-ion batteries having a structure in which the insulating layer was disposed between the positive electrode and the separator were evaluated as good (Cell production examples 3 and 5).

Further, in the temperature rise tests, it was confirmed that formation of the insulating layer improved safety (Cell production examples 2 to 5) and that the insulating layer coated on the positive electrode or the negative electrode provided a higher level of safety (Cell production examples 2 and 3).

Note that, in consideration of the results in Table 3, the safety of the insulating layer coated on the positive electrode was further evaluated as described below.

<Preparation of Liquid Composition>

[Production of Dispersion 1]

By using 3.5% poly(styrene-co-maleic anhydride), cumene terminated (manufactured by Merck), 50.0% alumina with the median particle diameter of 0.8 μm was sufficiently dispersed in 46.5% ethyl lactate (solvent A) to obtain a dispersion 1 with the solids content of 50%. The dispersion 1 had D50 of 1 μm or less and D90 of 2 μm or less.

Note that D50 refers to the median diameter D50 of an object measured using a fiber-optics particle analyzer (manufactured by Otsuka Electronics Co., Ltd., FPAR-1000) after diluting the object until the D50 value stabilizes. Similarly, D90 refers to the median diameter D90.

[Production of Dispersion 2]

By using 1.0% of the resin obtained in the above Resin synthesis example 1, 50.0% of alumina with the median particle diameter of 0.8 μm was sufficiently dispersed in 49.0% of ethyl lactate (solvent A) to obtain a dispersion 2 having the solid content of 50%. The dispersion 2 had D50 of 1 μm or less and D90 of 2 μm or less.

[Production of Dispersion 3]

By using 5.0% of the resin obtained in the Resin synthesis example 1 below, 50.0% of alumina with the median particle diameter of 0.8 μm was sufficiently dispersed in 45.0% of ethyl lactate (solvent A) to obtain a dispersion liquid 3 having the solid content of 50%. The dispersion 3 had D50 of 1 μm or less and D90 of 2 μm or less.

(Resin Synthesis Example 2)

The resin 2 of interest (Mw=8,400) was obtained in the same manner as in the above Resin synthesis example 1, except that 4.37% methoxytriethylene glycol acrylate was changed to 4.37% methoxytripropylene glycol acrylate (manufactured by Shin-Nakamura Chemical Co, Ltd., AM-30PG).

[Production of Dispersion 4]

By using 2.5% of a copolymer of maleic anhydride groups and α-olefin (manufactured by Mitsubishi Chemical Corp., DIACARNA (registered trademark) 30M), 50.0% of alumina with the median particle diameter of 0.8 μm was sufficiently dispersed in 47.5% of ethyl lactate (solvent A) to obtain a dispersion 4 having the solid content of 50%. The dispersion 4 had D50 of 1 μm or less and D90 of 2 μm or less.

[Production of Dispersion 5]

By using a polyfunctional comb-shaped polymer with a maleic anhydride group in the main chain and a polyoxyalkylene chain in the graft chain (manufactured by NOF Corp., AKM-0531), 50% of alumina with the median particle diameter of 0.8 μm was sufficiently dispersed in 48.5% of ethyl lactate (solvent A) to obtain a dispersion 5 having the solid content of 50%. The dispersion 5 had D50 of 1 μm or less and D90 of 2 μm or less.

[Production of Dispersion 6]

By using 2.5% of a polyfunctional comb-shaped polymer with a maleic anhydride group in the main chain and a polyoxyalkylene chain in the graft chain (manufactured by NOF Corp., SC-0708A), 50% of alumina with the median particle diameter of 0.8 μm was sufficiently dispersed in 47.5% of ethyl lactate (solvent A) to obtain a dispersion 6 having the solid content of 50%. The dispersion 6 had D50 of 1 μm or less and D90 of 2 μm or less.

[Production of Dispersion 7]

By using 3.5% of polyacrylic acid with an average molecular weight of about 5000 (manufactured by Fujifilm Wako Pure Chemical Corp.), 35.0% of alumina with the median particle diameter of 0.8 μm was sufficiently dispersed in 61.5% of ethyl lactate (solvent A) to obtain a dispersion 7 having the solid content of 35%. The dispersion 7 had D50 of 1 μm or less and D90 of 2 μm or less.

[Liquid Composition Production Example 2-1]

A liquid composition having the solid content of 40% was obtained by mixing 80.0% of the dispersion 1 and 20.0% of ethyl lactate (solvent A). The liquid composition had D50 of 1 μm or less and D90 of 2 μm or less.

[Liquid Composition Production Example 2-2]

A liquid composition was obtained in the same manner as in the Liquid composition production example 2-1, except that the insulating material of the dispersion 1 was changed to alumina having the median particle diameter of 0.52 μm.

[Liquid Composition Production Example 2-3]

A liquid composition was obtained in the same manner as in the Liquid composition production example 2-1, except that the insulating material of the dispersion 1 was changed to titanium oxide having the median particle diameter of 0.24 μm.

[Liquid Composition Production Example 2-4]

A liquid composition having the solid content of 40% was obtained by mixing 80.0% of the dispersion 2 and 20.0% of ethyl lactate (solvent A). The liquid composition had D50 of 1 μm or less and D90 of 2 μm or less.

[Liquid Composition Production Example 2-5]

A liquid composition was obtained in the same manner as in the Liquid composition production example 2-4, except that the insulating material of the dispersion 2 was changed to alumina having the median particle diameter of 0.52 μm.

[Liquid Composition Production Example 2-6]

A liquid composition was obtained in the same manner as in the Liquid composition production example 2-4, except that the insulating material of the dispersion 2 was changed to titanium oxide having the median particle diameter of 0.24 μm.

[Liquid Composition Production Example 2-7]

A liquid composition having the solid content of 40% was obtained by mixing 80.1% of the dispersion 3 and 19.9% of ethyl lactate (solvent A). The liquid composition had D50 of 1 μm or less and D90 of 2 μm or less.

[Liquid Composition Production Example 2-8]

A liquid composition was obtained in the same manner as in the Liquid composition production example 2-7, except that the insulating material of the dispersion 3 was changed to alumina having the median particle diameter of 0.52 μm.

[Liquid Composition Production Example 2-9]

A liquid composition was obtained in the same manner as in the Liquid composition production example 2-7, except that the insulating material of the dispersion 3 was changed to titanium oxide having the median particle diameter of 0.24 μm.

[Liquid Composition Production Example 2-101]

A liquid composition having the solid content of 40% was obtained by mixing 80.0% of the dispersion 4 and 20.0% of ethyl lactate (solvent A). The liquid composition had D50 of 1 μm or less and D90 of 2 μm or less.

[Liquid Composition Production Example 2-11]

A liquid composition having the solid content of 40% was obtained by mixing 80.0% of the dispersion 4, 19.6% of ethyl lactate (solvent A), and 0.4% of the polymer compound (manufactured by DKS Co. Ltd., EPAN 740). Note that the polymer compound was dissolved in ethyl lactate before mixing with the dispersion. The liquid composition had D50 of 1 μm or less and D90 of 2 μm or less.

[Liquid Composition Production Example 2-12]

A liquid composition was obtained in the same manner as in the Liquid composition production example 2-10, except that the insulating material of the dispersion 4 was changed to α-alumina, produced by pulverization, with the average particle diameter of 0.5 μm and the specific surface area of 7.8 g/$m^2$.

[Liquid Composition Production Example 2-13]

A liquid composition was obtained in the same manner as in the Liquid composition production example 2-11, except that the insulating material of the dispersion 4 was changed to α-alumina, produced by pulverization, with the average particle diameter of 0.5 μm and the specific surface area of 7.8 g/$m^2$.

[Liquid Composition Production Example 2-14]

A liquid composition was obtained in the same manner as in the Liquid composition production example 2-10, except that the insulating material of the dispersion 4 was changed to titanium oxide having the median particle diameter of 0.24 μm.

[Liquid Composition Production Example 2-15]

A liquid composition having the solid content of 40% was obtained by mixing 80.1% of the dispersion 5 and 19.9% of ethyl lactate (solvent A). The liquid composition had D50 of 1 μm or less and D90 of 2 μm or less.

[Liquid Composition Production Example 2-16]

A liquid composition having the solid content of 40% was obtained by mixing 80.1% of the dispersion 5, 19.5% of ethyl lactate (solvent A), and 0.4% of the polymer compound (manufactured by DKS Co. Ltd.). Note that the polymer compound was dissolved in ethyl lactate before mixing with the dispersion. The liquid composition had D50 of 1 μm or less and D90 of 2 μm or less.

[Liquid Composition Production Example 2-17]

A liquid composition was obtained in the same manner as in the Liquid composition production example 2-15, except that the insulating material of the dispersion 5 was changed to α-alumina, produced by pulverization, with the average particle diameter of 0.5 μm and the specific surface area of 7.8 $g/m^2$.

[Liquid Composition Production Example 2-18]

A liquid composition was obtained in the same manner as in the Liquid composition production example 2-16, except that the insulating material of the dispersion 5 was changed to α-alumina, produced by pulverization, with the average particle diameter of 0.5 μm and the specific surface area of 7.8 $g/m^2$.

[Liquid Composition Production Example 2-19]

A liquid composition was obtained in the same manner as in the Liquid composition production example 2-15, except that the insulating material of the dispersion 5 was changed to titanium oxide having the median particle diameter of 0.24 μm.

[Liquid Composition Production Example 2-20]

A liquid composition having the solid content of 40% was obtained by mixing 80.0% of the dispersion 6 and 20.0% of ethyl lactate (solvent A). The liquid composition had D50 of 1 μm or less and D90 of 2 μm or less.

[Liquid Composition Production Example 2-21]

A liquid composition having the solid content of 40% was obtained by mixing 80.0% of the dispersion 6, 19.6% of ethyl lactate (solvent A), and 0.4% of the polymer compound (manufactured by DKS Co. Ltd., EPAN 740). Note that the polymer compound was dissolved in ethyl lactate before mixing with the dispersion. The liquid composition had D50 of 1 μm or less and D90 of 2 μm or less.

[Liquid Composition Production Example 2-22]

A liquid composition was obtained in the same manner as in the Liquid composition production example 2-20, except that the insulating material of the dispersion 6 was changed to α-alumina, produced by pulverization, with the average particle diameter of 0.5 μm and the specific surface area of 7.8 $g/m^2$.

[Liquid Composition Production Example 2-23]

A liquid composition was obtained in the same manner as in the Liquid composition production example 2-21, except that the insulating material of the dispersion 6 was changed to α-alumina, produced by pulverization, with the average particle diameter of 0.5 μm and the specific surface area of 7.8 $g/m^2$.

[Liquid Composition Production Example 2-24]

A liquid composition was obtained in the same manner as in the Liquid composition production example 2-20, except that the insulating material of the dispersion 6 was changed to titanium oxide having the median particle diameter of 0.24 μm.

[Liquid Composition Production Example 2-25]

The dispersion 7 was use in Liquid composition example 2-25.

[Liquid Composition Production Example 2-26]A liquid composition was obtained in the same manner as in the Liquid composition production example 2-25, except that the insulating material of the dispersion 7 was changed to alumina having the median particle diameter of 0.52 μm.

[Liquid Composition Production Example 2-27]

A liquid composition was obtained in the same manner as in the Liquid composition production example 2-25, except that the insulating material of the dispersion 7 was changed to titanium oxide having the median particle diameter of 0.24 μm.

Examples 3-1 to 3-24 and Comparative examples 3-1 to 3-3

<Production of Negative Electrode>

A slurry for negative electrode mixture layer, which was obtained by kneading a negative electrode active material (manufactured by Showa Denko K.K., SCMG (registered trademark)-XRs), water, and a resin, was applied on both sides of a copper foil as a negative electrode base material by using a comma coater and then dried to form a negative electrode mixture layer. Next, the negative electrode mixture layer was pressed with a force of about 100 kN to obtain a negative electrode.

<Production of Positive Electrode>

A slurry for positive electrode mixture layer, which was obtained by kneading a positive electrode active material (manufactured by FE Mineral & Alloy Co., Ltd., lithium nickel oxide 503H), N-methylpyrrolidone, and a resin, was applied on both sides of an aluminum foil as a positive electrode base material by using a comma coater and then dried to form a positive electrode mixture layer. Next, after the positive electrode mixture layer was pressed with a force of about 100 kN, the liquid composition was ejected onto the positive electrode mixture layer using a liquid ejection device (manufactured by Ricoh Co., Ltd., EV2500) and a liquid ejection head MH 5421F (manufactured by Ricoh Co., Ltd.) to form an insulating layer with the basis weight of 0.7 $mg/cm^2$, thereby obtaining a positive electrode.

<Preparation of Non-Aqueous Electrolytic Solution>

Lithium hexafluorophosphate ($LiPF_6$) and lithium tetrafluoroborate ($LiBF_4$) were dissolved in ethylene carbonate to obtain a non-aqueous electrolytic solution.

<Production of Lithium-Ion Secondary Battery>

An electrode element was obtained by stacking two negative electrodes and one positive electrode via separators made of polyethylene with a thickness of 20 μm in a state in which the positive electrode lead wire and the negative electrode lead wire did not overlap. Next, after sandwiching the electrode element between laminate films, lamination sealing was performed to form a bag-like exterior. Next, after injecting the non-aqueous electrolytic solution into the exterior, the injection portion was sealed to obtain a lithium-ion secondary battery (refer to FIG. 20).

Comparative Example 3-4

<Production of Positive Electrode>

A slurry for positive electrode mixture layer, which was obtained by kneading a positive electrode active material (manufactured by FE Mineral & Alloy Co., Ltd., lithium nickel oxide 503H), N-methylpyrrolidone, and a resin, was applied on both sides of an aluminum foil as a positive electrode base material by using a comma coater and then dried to form a positive electrode mixture layer. Next, the positive electrode mixture layer was pressed with a force of about 100 kN to obtain a positive electrode.

That is, Comparative example 3-4 is different from the positive electrodes of Examples 3-1 to 3-24 and Comparative examples 3-1 to 3-3 in that no insulating layer is formed. A lithium-ion secondary battery was obtained in the same manner as in Examples 3-1 to 3-24 and Comparative examples 3-1 to 3-3, except that the positive electrode in which the insulating layer was not formed was obtained and used.

<Float Test>

In the same manner as the float test described above, the integrated charging capacity [mAh] with the constant voltage charge was calculated and evaluated.

<Temperature Rise Test>

A temperature rise test was performed to evaluate high temperature resistance of the lithium-ion secondary battery. Specifically, a 4.2V fully charged lithium-ion secondary battery was placed in a constant temperature bath, left at a temperature of 30° C. for 30 minutes, and then heated to 140° C. at a temperature rise rate of 5 C per minute. After reaching 140° C., the temperature was held for 30 minutes and decreased. The voltage of the lithium-ion secondary battery during this test was measured, and the lowest voltage [V] of the cell voltage when held at 140° C. for 30 minutes was obtained.

Table 4 shows the results of the float test and the temperature rise test for Examples 3-1 to 3-24 and Comparative examples 3-1 to 3-4.

TABLE 4

| | Liquid composition | Basis weight ($mg/cm^2$) | Float test | Temperature rise test |
|---|---|---|---|---|
| Example 3-1 | Production example 2-1 | 0.7 | A | A |
| Example 3-2 | Production example 2-2 | 0.7 | A | A |
| Example 3-3 | Production example 2-3 | 0.7 | A | A |
| Example 3-4 | Production example 2-4 | 0.7 | A | A |
| Example 3-5 | Production example 2-5 | 0.7 | A | A |
| Example 3-6 | Production example 2-6 | 0.7 | A | A |
| Example 3-7 | Production example 2-7 | 0.7 | A | A |
| Example 3-8 | Production example 2-8 | 0.7 | A | A |
| Example 3-9 | Production example 2-9 | 0.7 | A | A |
| Example 3-10 | Production example 2-10 | 0.7 | A | A |
| Example 3-11 | Production example 2-11 | 0.7 | A | A |
| Example 3-12 | Production example 2-12 | 0.7 | A | A |
| Example 3-13 | Production example 2-13 | 0.7 | A | A |
| Example 3-14 | Production example 2-14 | 0.7 | A | A |
| Example 3-15 | Production example 2-15 | 0.7 | A | A |
| Example 3-16 | Production example 2-16 | 0.7 | A | A |
| Example 3-17 | Production example 2-17 | 0.7 | A | A |
| Example 3-18 | Production example 2-18 | 0.7 | A | A |
| Example 3-19 | Production example 2-19 | 0.7 | A | A |
| Example 3-20 | Production example 2-20 | 0.7 | A | A |
| Example 3-21 | Production example 2-21 | 0.7 | A | A |
| Example 3-22 | Production example 2-22 | 0.7 | A | A |
| Example 3-23 | Production example 2-23 | 0.7 | A | A |
| Example 3-24 | Production example 2-24 | 0.7 | A | A |
| Comparative example 3-1 | Production example 2-25 | 0.7 | B | B |
| Comparative example 3-2 | Production example 2-26 | 0.7 | B | B |
| Comparative example 3-3 | Production example 2-27 | 0.7 | B | B |
| Comparative example 3-4 | — | — | B | C |

From Table 4, it is found that Examples 3-1 to 3-24 can prevent leakage current under any conditions and have good heat resistance in the temperature rise test and that using the present embodiment makes it possible to provide the heat resistance in the temperature rise test while maintaining the input/output characteristics and prevent oxidative deterioration of the resin separator.

On the other hand, in Comparative examples 3-1 to 3-3, although the insulating layers are formed on the positive electrode mixture layers, leakage current cannot be prevented as in Comparative Example 3-4 in which the insulating layer is not formed on the positive electrode, and the heat resistance is also poor in the result of the temperature rise test.

Examples 3-25 and 3-36, Comparative Examples 3-4 to 3-8

<Production of Negative Electrode>

A slurry for negative electrode mixture layer, which was obtained by kneading a negative electrode active material (manufactured by Showa Denko K.K., SCMG-XRs), water, and a resin, was applied on both sides of a copper foil as a negative electrode base material by using a comma coater and then dried to form a negative electrode mixture layer. Next, the negative electrode mixture layer was pressed with a force of about 100 kN to obtain a negative electrode.

<Production of Positive Electrode>

A slurry for positive electrode mixture layer, which was obtained by kneading a positive electrode active material (manufactured by JFE Mineral & Alloy Co., Ltd., lithium nickel oxide 503H), N-methylpyrrolidone, and a resin, was applied on both sides of an aluminum foil as a positive electrode base material by using a comma coater and then dried to form a positive electrode mixture layer. Next, after the positive electrode mixture layer was pressed with a force of about 100 kN, the liquid composition was bar-coated on the positive electrode mixture layer using a non-wire bar coater (manufactured by AS ONE Corp.) to form an insulating layer with the basis weight of 0.2 to 2.0 mg/cm$^2$, thereby obtaining a positive electrode.

<Preparation of Non-Aqueous Electrolytic Solution>

Lithium hexafluorophosphate ($LiPF_6$) and lithium tetrafluoroborate ($LiBF_4$) were dissolved in ethylene carbonate to obtain a non-aqueous electrolytic solution.

<Production of Lithium-Ion Secondary Battery>

An electrode element was obtained by stacking two negative electrodes and one positive electrode via separators made of polyethylene with a thickness of 20 μm in a state in which the positive electrode lead wire and the negative electrode lead wire did not overlap. Next, after sandwiching the electrode element between laminate films, lamination sealing was performed to form a bag-like exterior. Next, after injecting the non-aqueous electrolytic solution into the exterior, the injection portion was sealed to obtain a lithium-ion secondary battery (refer to FIG. 20).

<Output and Input of Lithium-Ion Secondary Battery>

A charge/discharge test was performed to evaluate the output and input of the lithium-ion secondary battery. Specifically, a 4.2V fully charged secondary battery was subjected to constant-current discharge at a current rate of 1 C for 10 minutes, so that SOC of the lithium-ion secondary battery was adjusted to 90%. Next, after the constant current discharge was performed for 10 seconds with pulses at the current rate of 1 C, followed by a 1-minute rest period, constant current charge was performed for 10 seconds with pulses at the current rate of 1 C. Next, after a 1-minute rest period, the 10-second constant current charge/discharge was repeated at the current rate of 3 C and 5 C at the same time intervals. Next, after a 30-minute rest period, the constant current charge was performed for 10 seconds at the current rate of 1 C to adjust SOC to 80%, and then the 10-second constant current charge/discharge was repeated at 1 C, 3 C and 5 C at the same time intervals. Next, the same measurement was repeated with each of SOCs, specifically. SOC 70%, SOC 60%, down to SOC 10%.

The output (ref-ratio output) was obtained by calculating an output [W] by calculating a constant current value at the discharge cutoff voltage of 2.5 V by linearly approximating each constant end-of-discharge voltage, and multiplying the constant current value by 2.5 V.

The input (ref-ratio input) was obtained by calculating an input [W] by calculating a constant current value at the charge cutoff voltage of 4.2 V by linearly approximating each constant end-of-charge voltage, and multiplying the constant current value by 4.2 V.

Both the output (ref-ratio output) and the input (ref-ratio input) were evaluated as good when their values are 80% or more, and as poor when their values are less than 80%.

[Float Test]

Measurement and evaluation were performed in the same manner as in Examples 3-1 to 3-24 and Comparative examples 3-1 to 3-4 described above.

[Temperature Rise Test]

Measurement and evaluation were performed in the same manner as in Examples 3-1 to 3-24 and Comparative examples 3-1 to 3-4 described above.

[Measurement of Coverage]

The average value of the coverage ("average coverage") of the electrode mixture layer by the insulating layer can be obtained as follows.

First, microscopic images (about 100 times magnification) of freely selected regions (about 5 sites) on the surface of the positive electrode on which the insulating layer is formed are saved as image data such as a bitmap file or a JPEG file. Next, the image data is binarized based on the color density using image editing and processing software such as PHOTOSHOP (registered trademark). After obtaining a ratio of the density of 50% or more, that is, the coverage of the positive electrode mixture layer by the insulating layer in each freely selected region, the average value of the ratio was calculated to obtain the coverage.

Table 5 shows the results of the basis weight, the float test, the temperature rise test, the output, the input, and the coverage for Examples 3-25 and 3-36 and Comparative examples 3-4 to 3-8.

TABLE 5

| | Liquid composition | Basis weight (mg/cm$^2$) | Float test | Temperature rise test | Ref-ratio Output | Ref-ratio input | Coverage (%) |
|---|---|---|---|---|---|---|---|
| Example 3-25 | Production example 2-10 | 0.3 | A | A | 95 | 97 | 70 |
| Example 3-26 | Production example 2-10 | 0.4 | A | A | 93 | 95 | 75 |
| Example 3-27 | Production example 2-10 | 0.5 | A | A | 90 | 93 | 80 |
| Example 3-28 | Production example 2-10 | 0.7 | A | A | 88 | 90 | 85 |
| Example 3-29 | Production example 2-10 | 1.0 | A | A | 83 | 89 | 90 |
| Example 3-30 | Production example 2-10 | 1.5 | A | A | 81 | 84 | 100 |
| Example 3-31 | Production example 2-11 | 0.3 | A | A | 93 | 96 | 70 |
| Example 3-32 | Production example 2-11 | 0.4 | A | A | 91 | 94 | 75 |
| Example 3-33 | Production example 2-11 | 0.5 | A | A | 88 | 91 | 80 |
| Example 3-34 | Production example 2-11 | 0.7 | A | A | 86 | 88 | 85 |
| Example 3-35 | Production example 2-11 | 1.0 | A | A | 82 | 86 | 90 |

TABLE 5-continued

| | Liquid composition | Basis weight ($mg/cm^2$) | Float test | Temperature rise test | Ref-ratio Output | Ref-ratio input | Coverage (%) |
|---|---|---|---|---|---|---|---|
| Example 3-36 | Production example 2-11 | 1.5 | A | A | 80 | 83 | 100 |
| Comparative example 3-4 | — | 0 | B | C | 100 | 100 | 0 |
| Comparative example 3-5 | Production example 2-10 | 0.2 | B | B | 96 | 98 | 60 |
| Comparative example 3-6 | Production example 2-10 | 2.0 | A | A | 76 | 78 | 100 |
| Comparative example 3-7 | Production example 2-11 | 0.2 | B | B | 94 | 97 | 60 |
| Comparative example 3-8 | Production example 2-11 | 2.0 | A | A | 76 | 78 | 100 |

From Table 5, in Examples 3-25 and 3-36 in which the insulating layers were formed on the positive electrode mixture layers, leakage current could be prevented under any conditions, the heat resistance in the temperature rise test was good, and the input/output characteristics were 80% or more. That is, it is found that using the present embodiment makes it possible to provide the heat resistance in the temperature rise test while maintaining the input/output characteristics and prevent oxidation degradation of the resin separator.

On the other hand, in Comparative examples 3-5 and 3-7 in which the insulating layers were formed on the positive electrode mixture layers, leak-age current could not be prevented as in Comparative example 3-4 in which the insulating layer was not formed on the positive electrode, and the heat resistance was worse than Examples 3-25 and 3-36 in the result of the temperature rise test. In Comparative examples 3-6 and 3-8, leakage current could be prevented, however the input/output was less than 80%.

The embodiments of the present disclosure have been described above. However, the present disclosure is not limited to specific embodiments, and various modifications and changes can be made within the scope of the disclosure described in the claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An electrode comprising:

a current collector;

an electrode mixture layer on the current collector, the electrode mixture layer including an active material; and an insulating layer on the electrode mixture layer, the insulating layer including:

an insulating material; and at least one resin having a repeating structural unit represented by a following general formula (1) or (2):

(1)

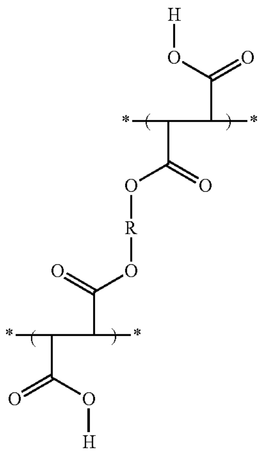

(2)

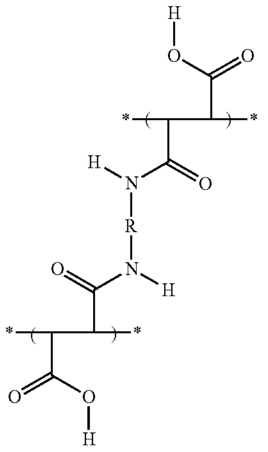

where, in the general formulae, "*" represents a bonding site with an adjacent main chain structural unit, and "R" represents at least one structure of polyethylene oxide, polypropylene oxide, polycarbonate, silicone, polybutadiene, or hydrogenated polybutadiene butane, wherein a mass ratio of the resin having the repeating structural unit represented by the general formula (1) or (2) relative to the insulating material is 1.5% or more and 15% or less.

2. The electrode according to claim 1, wherein the resin having the repeating structural unit represented by the general formula (1) or (2) is a reaction product of a resin having the repeating structural unit represented by the following general formula (3) and a resin represented by the following general formula (5):

(3)

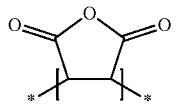

(5)

R3—R2—R4 where, in the general formulae, "*" represents a bonding site with an adjacent main chain structural unit, and "R2" represents at least one structure of polyethylene oxide, polypropylene oxide, polycarbonate, silicone, polybutadiene, or hydrogenated polybutadiene butane, and "R3" and "R4" each independently represent a hydroxyl group or an amino group.

3. The electrode according to claim 2, wherein "R2" in the general formula (5) is a poloxamer.

4. The electrode according to claim 1, wherein "R" in the general formula (1) or (2) is a poloxamer.

5. The electrode according to claim 1, further comprising a polymer compound including hydroxyl groups or amino groups at least at two or more terminals.

6. The electrode according to claim 5, wherein the polymer compound is a poloxamer.

7. The electrode according to claim 1, wherein an average coverage of the insulating layer for the electrode mixture layer is 70% or more.

8. The electrode according to claim 1, wherein the insulating material is an inorganic oxide.

9. The electrode according to claim 8, wherein the inorganic oxide is a-alumina.

10. An electrode comprising:

a current collector;

an electrode mixture layer on the current collector, the electrode mixture layer including an active material; and an insulating layer on the electrode mixture layer, the insulating layer including:

an insulating material; and at least one resin having a repeating structural unit represented by a following general formula (4):

(4)

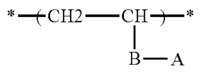

where, in general formula (4), "*" represents a bonding site with an adjacent main chain structural unit, "A" represents an alkyleneoxy chain having a repeating unit structure of an ethyloxy group or a propyloxy group terminally protected by a hydroxyl group or an alkyl group having 1 to 4 carbon atoms, and "B" represents an ester group, an amide group, or an oxygen atom.

11. The electrode according to claim 10, wherein "A" in the general formula (4) includes the ethyloxy group terminally protected by a hydroxyl group or an alkyl group having 1 to 4 carbon atoms.

12. An electrode comprising:

a current collector;

an electrode mixture layer on the current collector, the electrode mixture layer including an active material; and an insulating layer on the electrode mixture layer, the insulating layer including:

an insulating material; and at least one resin having a repeating structural unit represented by a following general formula (1), (2), or (4):

(1)

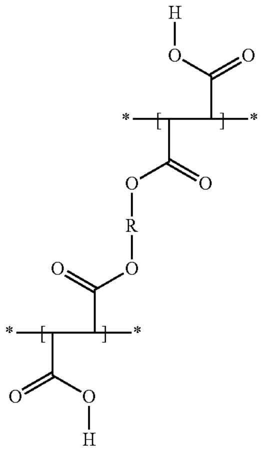

(2)

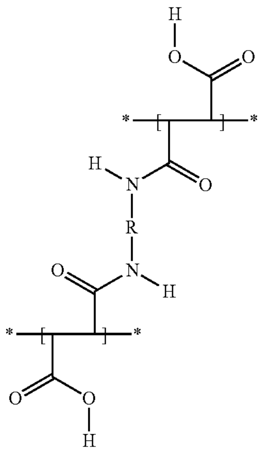

(4)

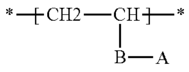

where, in the general formulae, "*" represents a bonding site with an adjacent main chain structural unit, "R" represents at least one structure of polyethylene oxide, polypropylene oxide, polycarbonate, silicone, polybutadiene, or hydrogenated polybutadiene butane, "A" represents an alkyleneoxy chain having a repeating unit structure of an ethyloxy group or a propyloxy group terminally protected by a hydroxyl group or an alkyl group having 1 to 4 carbon atoms, and "B" represents an ester group, an amide group, or an oxygen atom, wherein the resin having the repeating structural unit represented by the general formula (1) or (2) is a reaction product of the resin having the repeating structural unit represented by general formula (3) and a resin represented by the following general formula (5):

(3)

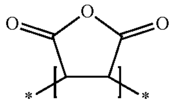

(5)

R3—R2—R4 where, in the general formula (5), "R2" represents at least one structure of polyethylene oxide, polypropylene oxide, polycarbonate, silicone, polybutadiene, or hydrogenated polybutadiene butane, and "R3" and "R4" each independently represent a hydroxyl group or an amino group.

13. The electrode according to claim 12, wherein:

the active material in the electrode mixture layer includes a positive electrode active material; and the resin in the insulating layer includes at least one resin having the repeating structural unit represented by the general formula (3) or (4).

14. The electrode according to claim 12, wherein a mass ratio of the resin having the repeating structural unit represented by the general formula (3) or (4) relative to the insulating material is 0.3% or more and 20% or less.

15. An electrochemical element (50) comprising the electrode according to claim 1.

* * * * *